(12) United States Patent
Tojo

(10) Patent No.: US 7,038,736 B2
(45) Date of Patent: May 2, 2006

(54) MOVING IMAGE PROCESSING APPARATUS AND METHOD, AND COMPUTER READABLE MEMORY

(75) Inventor: Hiroshi Tojo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 768 days.

(21) Appl. No.: 09/954,302

(22) Filed: Sep. 18, 2001

(65) Prior Publication Data

US 2002/0047936 A1    Apr. 25, 2002

(30) Foreign Application Priority Data

Sep. 21, 2000   (JP)  .............................. 2000-287597
Sep. 21, 2000   (JP)  .............................. 2000-287598

(51) Int. Cl.
*H04N 5/14*   (2006.01)
*H04N 7/12*   (2006.01)

(52) U.S. Cl. .................................. 348/700; 375/240.26
(58) Field of Classification Search ................ 348/700; 375/240.01, 240.26
See application file for complete search history.

(56) References Cited

U.S. PATENT DOCUMENTS

| | | | | |
|---|---|---|---|---|
| 5,642,294 | A * | 6/1997 | Taniguchi et al. | 348/700 |
| 5,835,163 | A * | 11/1998 | Liou et al. | 348/700 |
| 5,911,008 | A * | 6/1999 | Niikura et al. | 382/236 |
| 6,195,458 | B1 * | 2/2001 | Warnick et al. | 382/173 |
| 6,580,829 | B1 * | 6/2003 | Hurst et al. | 382/236 |
| 6,606,409 | B1 * | 8/2003 | Warnick et al. | 382/173 |

FOREIGN PATENT DOCUMENTS

| | | |
|---|---|---|
| JP | 10-22471 | 1/1998 |
| JP | 10-224741 | 8/1998 |
| JP | 2839132 | 10/1998 |

* cited by examiner

*Primary Examiner*—Mehrdad Dastouri
*Assistant Examiner*—Dave Czekaj
(74) *Attorney, Agent, or Firm*—Fitzpatrick, Cella, Harper & Scinto

(57) ABSTRACT

A frame extraction unit detects a luminance change point frame in which the brightness change amount between frames is equal to or higher than a threshold value from a moving image formed by a plurality of frames. A flash check unit checks the presence/absence of a flash portion in the moving image on the basis of the detected luminance change point frame.

13 Claims, 22 Drawing Sheets

| FRAME ID OF CUT POINT |
|---|
| 1 |
| 91 |
| 259 |
| 401 |
| : |

F I G. 15B
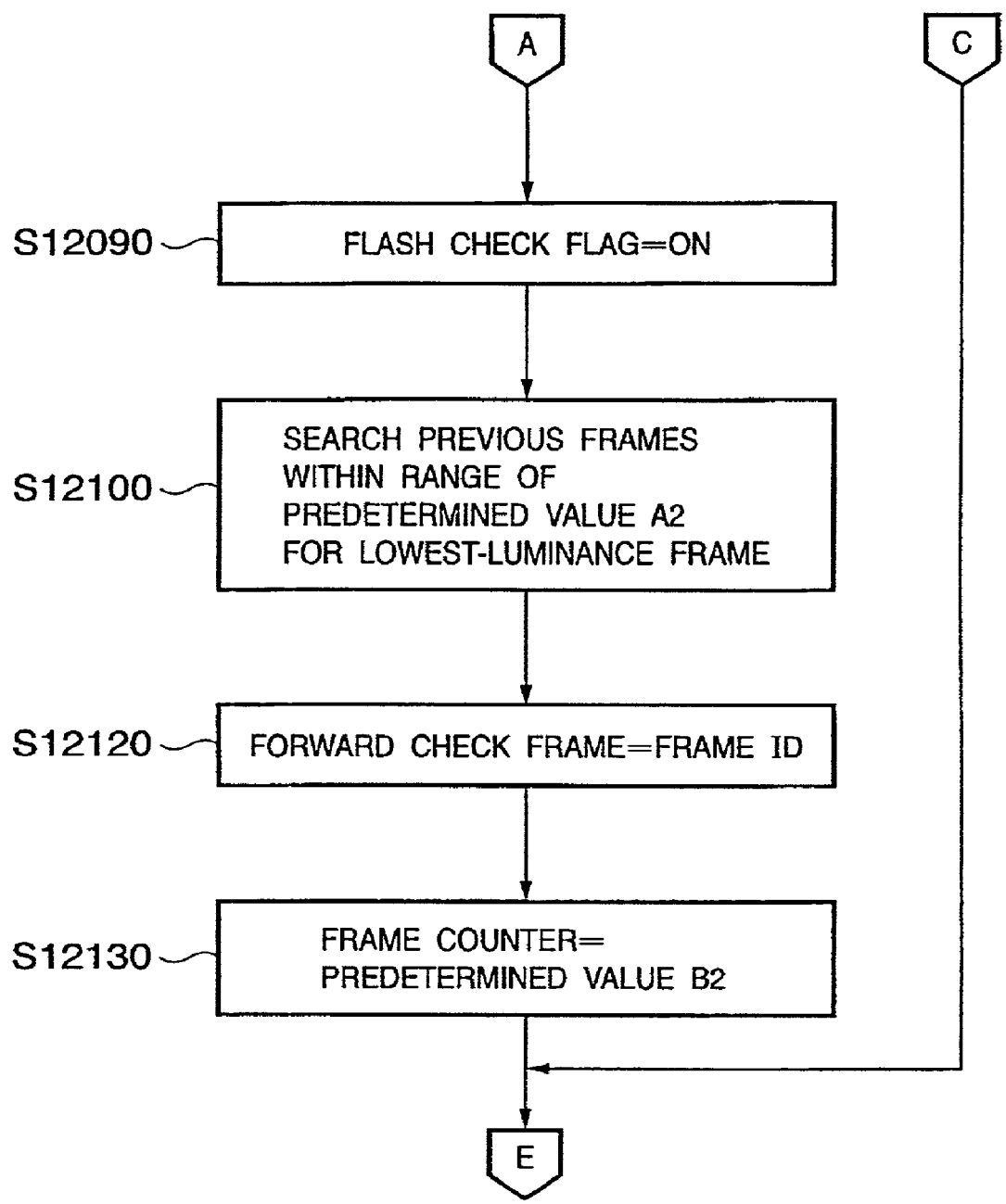

MOVING IMAGE PROCESSING APPARATUS AND METHOD, AND COMPUTER READABLE MEMORY

FIELD OF THE INVENTION

The present invention relates to a moving image processing apparatus and method for detecting a flash portion or cut point in an input moving image, and a computer readable memory.

BACKGROUND OF THE INVENTION

Conventionally, attempts have been made to detect a cut point as a change in scene (cutaway) included in a moving image, and to form indices which are used to browse and search the moving image. Upon detecting a cut point, if a flash-emitted frames (flash portion) is inserted, it is erroneously detected as a cut point, and some solutions to this problem have been proposed. In U.S. Pat. No. 2,839,132, an inter-frame distance table is prepared for all combinations of three or more frames, a scene change ratio is computed based on the inter-frame distance table, and if the frame change ratio is equal to or higher than a threshold value, a cut point is determined. In Japanese Patent Laid-Open No. 10-224741, as for a frame N of interest and its previous and next frames (N−1) and (N+1), if N and (N−1) have a low correlation value, and (N−1) and (N+1) have a high correlation value, N is determined to be a flash portion, and is excluded from frames from which a cut point is to be detected. Also, as for the frame N of interest and its previous and next frames (N−1), (N+1), and (N+2), correlation values between N and (N−1), (N+1) and (N−1), and (N+2) and (N−1) are computed. If N and (N−1), and (N+1) and (N−1) have low correlation values, and (N+2) and (N−1) have a high correlation value, N and (N+1) are determined to be flash portions, and are excluded from frames from which a cut point is to be detected.

However, the method of U.S. Pat. No. 2,839,132 must obtain inter-frame distances for all combinations of three or more frames. To obtain higher precision, inter-frame distances of more frames must be computed, resulting in higher computation cost. Also, the scene change ratio must also be computed, and the computation cost is high. On the other hand in Japanese Patent Laid-Open No. 10-224741, a number of computation of inter-frame distance is little, and the computation cost is low. However, e.g., a press conference in a news movie, since a plurality of cameras emit flashes of light many times, three or more frames included by the flashes of light may continue. However, the above method can only cope with a case wherein two frames influenced by flashes of light continue, resulting in poor precision.

SUMMARY OF THE INVENTION

The present invention has been made in consideration of the aforementioned problems, and has as its object to provide a moving image processing apparatus and method, which can execute flash detection with a smaller computation volume while maintaining high precision, and can detect cut points while eliminating detection errors due to the presence of a flash portion by exploiting the flash detection result, and a computer readable memory.

According to the present invention, the foregoing object is attained by providing a moving image processing apparatus for detecting a flash portion in an input moving image, comprising: detection means for detecting a change point frame, in which a brightness change amount between frames is not less than a threshold value, from the moving image formed by a plurality of frames; and determination means for determining the presence/absence of a flash portion in the moving image on the basis of the change point frame detected by the detection means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 15B is a flow chart showing the processing sequence of the cut point detection function of the sixth embodiment;

DESCRIPTION OF THE PREFERRED EMBODIMENTS

Preferred embodiments of the present invention will be described in detail hereinafter with reference to the accompanying drawings.

Figure 1:
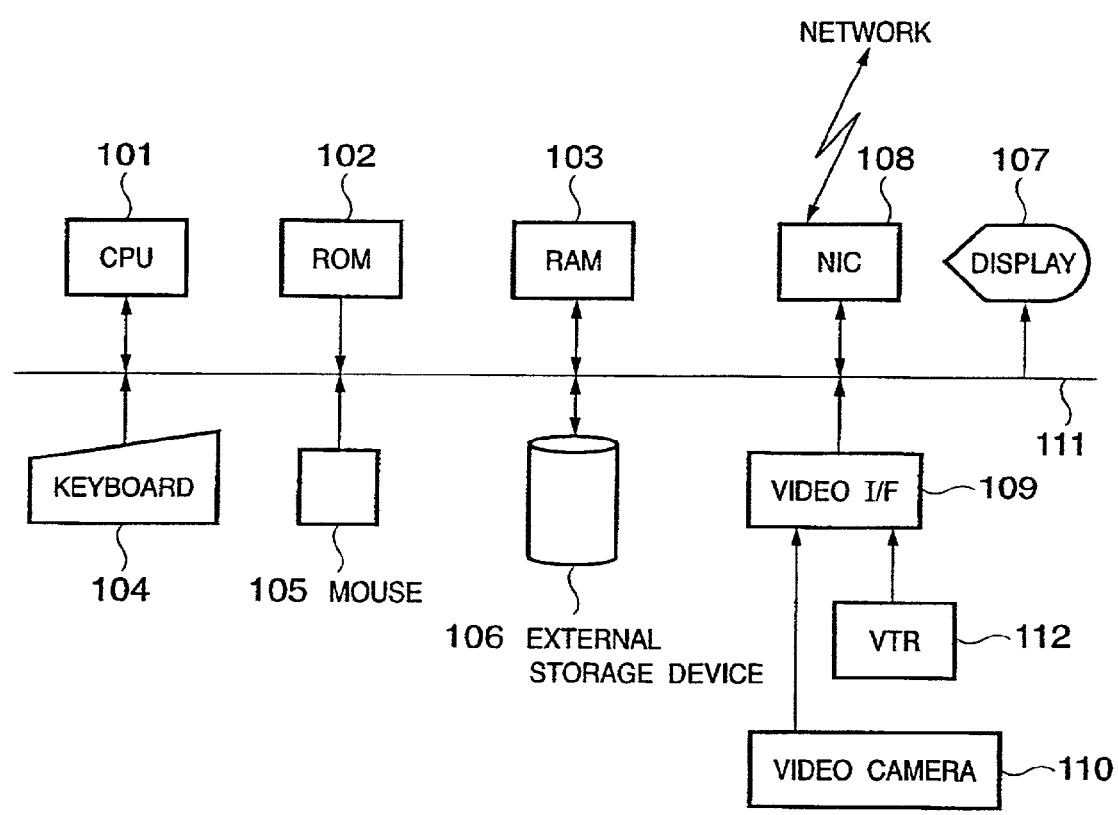
FIG. 1 is a block diagram showing the control arrangement of a moving image processing apparatus that can be used in respective embodiments of the present invention.

FIG. 1 is a block diagram showing the control arrangement of a moving image processing apparatus which can be used in respective embodiments of the present invention.

Referring to FIG. 1, reference numeral 101 denotes a CPU for executing various kinds of control in scene extraction. Reference numeral 102 denotes a ROM which stores a boot program executed upon starting up this apparatus, and various data. Reference numeral 103 denotes a RAM which stores a control program to be processed by the CPU 101, and provides a work area used when the CPU 101 executes various kinds of control. Reference numeral 104 denotes a keyboard; and 105, a mouse, both of which provide various input operation environments by the user.

Reference numeral 106 denotes an external storage device which comprises a hard disk, floppy disk, CD-ROM, or the like. Reference numeral 107 denotes a display which comprises, e.g., a CRT display, and displays the processing result and the like to the user. Reference numeral 108 denotes a network interface (NIC) which allows communications with devices on the network. Reference numeral 109 denotes a video interface which allows capturing of a moving image from a video camera 110 and VTR 112. Reference numeral 111 denotes a bus for interconnecting the aforementioned building components.

Note that the video camera 110, VTR 112, and external storage device 106 of the aforementioned building components may be replaced by those connected to the network.

First Embodiment

Figure 2:
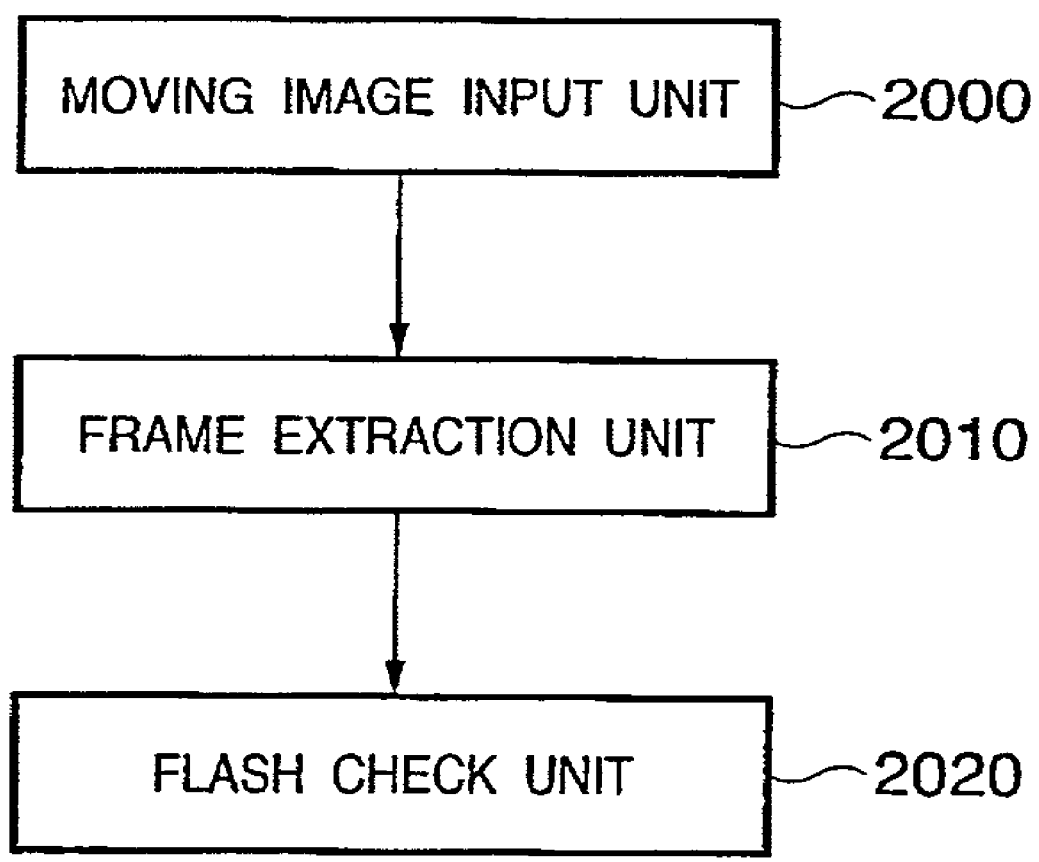
FIG. 2 is a block diagram showing the functional arrangement of a moving image processing apparatus of the first embodiment.

FIG. 2 is a block diagram showing the functional arrangement of a moving image processing apparatus of the first embodiment.

Referring to FIG. 2, reference numeral 2000 denotes a moving image input unit for inputting a moving image captured from the video camera 110, VTR 112, or the like via the video interface 109 or a moving image captured from a device on the network via the network interface 108. Reference numeral 2010 denotes a frame extraction unit for extracting frames (images) that form a moving image in turn. Reference numeral 2020 denotes a flash check unit for checking a flash portion in the moving image.

The processing sequence of a flash detection function implemented by the moving image processing apparatus of the first embodiment with the aforementioned arrangement will be explained below using FIG. 3.

Figure 3:
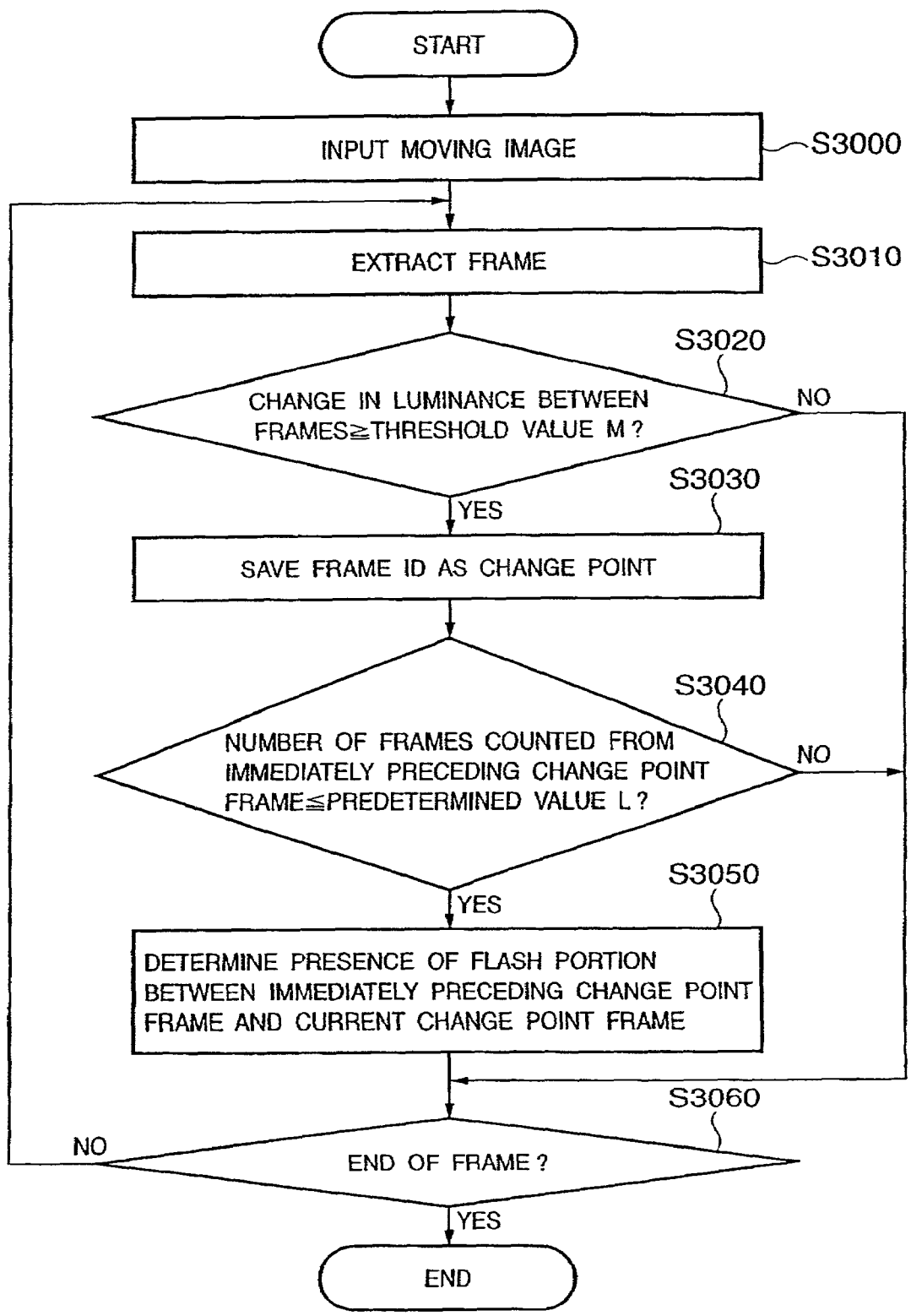
FIG. 3 is a flow chart showing the processing sequence of a flash detection function of the first embodiment.

FIG. 3 is a flow chart showing the processing sequence of the flash detection function of the first embodiment.

In step S3000, the moving image input unit 2000 inputs a moving image to be processed. In step S3010, the frame extraction unit 2010 extracts each frame from the moving image to be processed, and sends it to the flash check unit 2020. It is checked in step S3020 if a luminance change amount between neighboring frames is equal to or larger than a threshold value M. If flash light is emitted, one or more frames with high luminance appear under the influence of the flash light, as shown in, e.g., FIG. 4. At this time, a large luminance difference from the immediately preceding frame is generated in a frame at a point (a) as the beginning of the influence of flash light, and a frame at a point (b) after the end of the influence of flash light. Step S3020 aims at detecting a frame at such change point. Hence, the threshold value M must be a sufficiently large value. The threshold value M is obtained by experiments, and is not limited to a specific value.

If it is determined in step S3020 that the luminance change amount is equal to or larger than the threshold value M (YES in step S3020), the flow advances to step S3030. On the other hand, if the luminance change amount is smaller than the threshold value M (NO in step S3020), the flow jumps to step S3060.

In step S3030, a frame of the current frame ID is held in the RAM 103 as a change point. It is checked in step S3040 if the number of frames counted from the immediately preceding change point frame that has already been saved in the RAM 103 is equal to or smaller than a predetermined value L. If no change point frame is detected yet, the flow jumps to step S3060 to execute an exceptional process. Normally, flash light is emitted discontinuously. For example, even in an environment in which many electronic flashes emit light at the same time like in a press conference scene of a news program, frames influenced by flash light continue only for a short period of time. Hence, the predetermined value L indicates a predetermined number of frames which may be continuously influenced by flash light. This value is obtained by experiments and is preferably set to indicate around five frames although it is not particularly limited.

If it is determined in step S3040 that the number of frames is equal to or smaller than the predetermined value L (YES in step S3040), the flow advances to step S3050 to determine that a flash portion is present between the immediately preceding change point and the current change point. On the other hand, if the number of frames is smaller than the predetermined value L (NO in step S3040), the flow jumps to step S3060.

It is checked in step S3060 if frames to be processed still remain. If frames to be processed still remain (NO in step S3060), the flow returns to step S3010. On the other hand, if frames to be processed do not remain (YES in step S3060), the processing ends.

As described above, according to the first embodiment, even when a flash portion is hard to check (e.g., three or more frames influenced by flash light continue), a flash portion can be detected with high precision. Furthermore, as frame comparison need only be made between neighboring frames, and no new amount such as a scene change ratio need be calculated, the computation cost can be suppressed.

Second Embodiment

Figure 5:
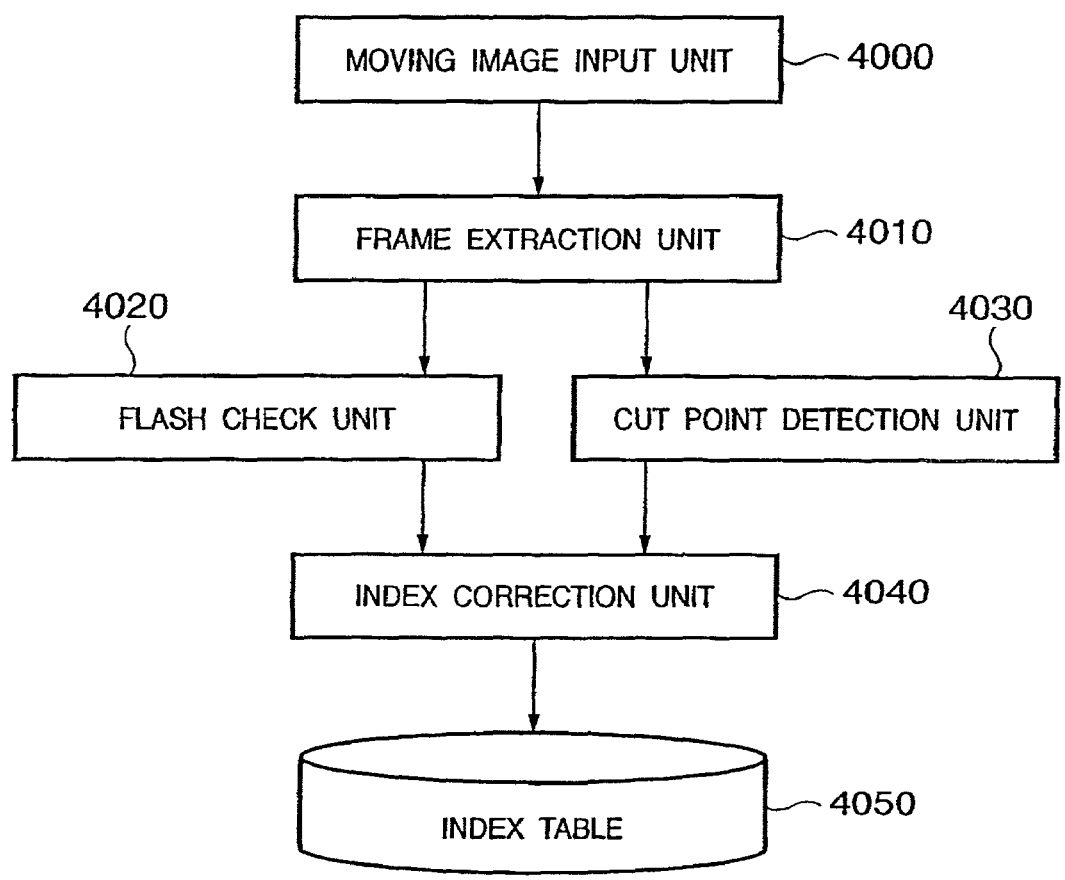
FIG. 5 is a block diagram showing the functional arrangement of a moving image processing apparatus of the second embodiment.

FIG. 5 is a block diagram showing the functional arrangement of a moving image processing apparatus of the second embodiment.

Referring to FIG. 5, reference numeral 4000 denotes a moving image input unit for inputting a moving image captured from the video camera 110, VTR 112, or the like via the video interface 109 or a moving image captured from a device on the network via the network interface 108. Reference numeral 4010 denotes a frame extraction unit for extracting frames (images) that form a moving image in turn. Reference numeral 4020 denotes a flash check unit for checking a flash portion. Reference numeral 4030 denotes a cut point detection unit for detecting a cut point frame in the moving image. Reference numeral 4040 denotes an index correction unit for correcting index information of a frame as the output result of the cut point detection unit 4030 using the output result of the flash check unit 4020. Reference numeral 4050 denotes an index table which stores index information corrected by the index correction unit 4040 in the form of table. This index table 4050 is stored in, e.g., the RAM 103.

The processing sequence of a flash detection function of the moving image processing apparatus of the second embodiment with the above arrangement will be explained below.

Since the moving image input unit 4000, frame extraction unit 4010, and flash check unit 4020 respectively correspond to the moving image input unit 2000, frame extraction unit 2010, and flash check unit 2020 of the first embodiment, and their processing sequence is the same as that in the first embodiment, a description thereof will be omitted. Upon determining a flash portion, the flash check unit 4020 outputs the frame ID of that change point to the index correction unit 4040. The index correction unit 4040 holds all frame IDs of frames, which are determined to be flash portions, in the RAM 103.

The processing sequence of the cut point detection unit 4030 will be explained below.

Figures 6, 7:
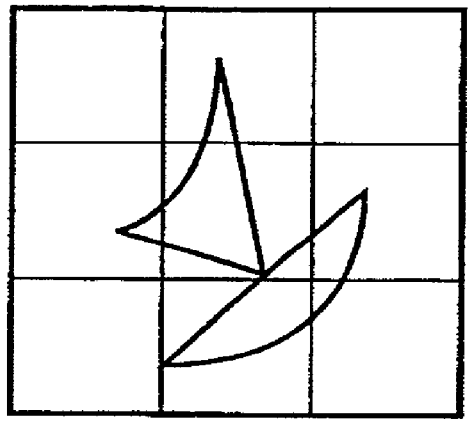
FIG. 6 shows an example of a frame broken up into blocks in the second embodiment.
FIG. 7 shows an example of an index table of the second embodiment.

The cut point detection unit 4030 calculates inter-frame similarity distances between the frame of interest and a previous frame group in turn to detect a cut point frame. The previous frame group includes one or a plurality of frames. Hence, for the first frame of the moving image, this process starts after a required number of frames are extracted. An algorithm of the inter-frame similarity distance computation is not particularly limited. As the simplest embodiment, each frame to be compared is broken up into a plurality of blocks in the vertical and horizontal directions, as shown in FIG. 6, R, G, and B average values of each block are computed, and the sum of squares of the differences between the R, G, and B channels of corresponding blocks to be compared is computed. This square sum is used as an inter-frame similarity distance: it is determined that two frames are similar as this distance is smaller, or it is determined that two frames are not similar, i.e., the frame of interest is highly likely to be a cut point as the distance is larger. That computation formula is described by:

$$\sum_{i=1}^{K}\{(P1_{iR} - P2_{iR})^2 + (P1_{iG} - P2_{iG})^2 + (P1_{iB} - P2_{iB})^2\}$$

where
  i: a block, the process of which is under way
  K: the number of segmented blocks
  $P1_{iR}$: the average value of the R channel of the i-th block of the immediately preceding frame
  $P1_{iG}$: the average value of the G channel of the i-th block of the immediately preceding frame
  $P1_{iB}$: the average value of the B channel of the i-th block of the immediately preceding frame
  $P2_{iR}$: the average value of the R channel of the i-th block of the current frame
  $P2_{iG}$: the average value of the G channel of the i-th block of the current frame
  $P2_{iB}$: the average value of the B channel of the i-th block of the current frame The frame ID of the detected cut point frame is output to the index correction unit 4040 as index information. The index correction unit 4040 holds all pieces of index information in the RAM 103. The index correction unit 4040 removes the frame ID that matches the change point frame, at which the presence of flash is detected by the flash check unit 4020, from index information obtained by the cut point detection unit 4030. In this manner, the frame ID obtained by erroneously detecting a flash portion as a cut point frame can be removed. The index correction unit 4030 stores the corrected index information in the index table 4050. The index table stores the frame IDs of cut points, as shown in FIG. 7.

As described above, according to the second embodiment, a detection error of a cut point frame due to flash light can be efficiently removed.

Third Embodiment

Figure 8:
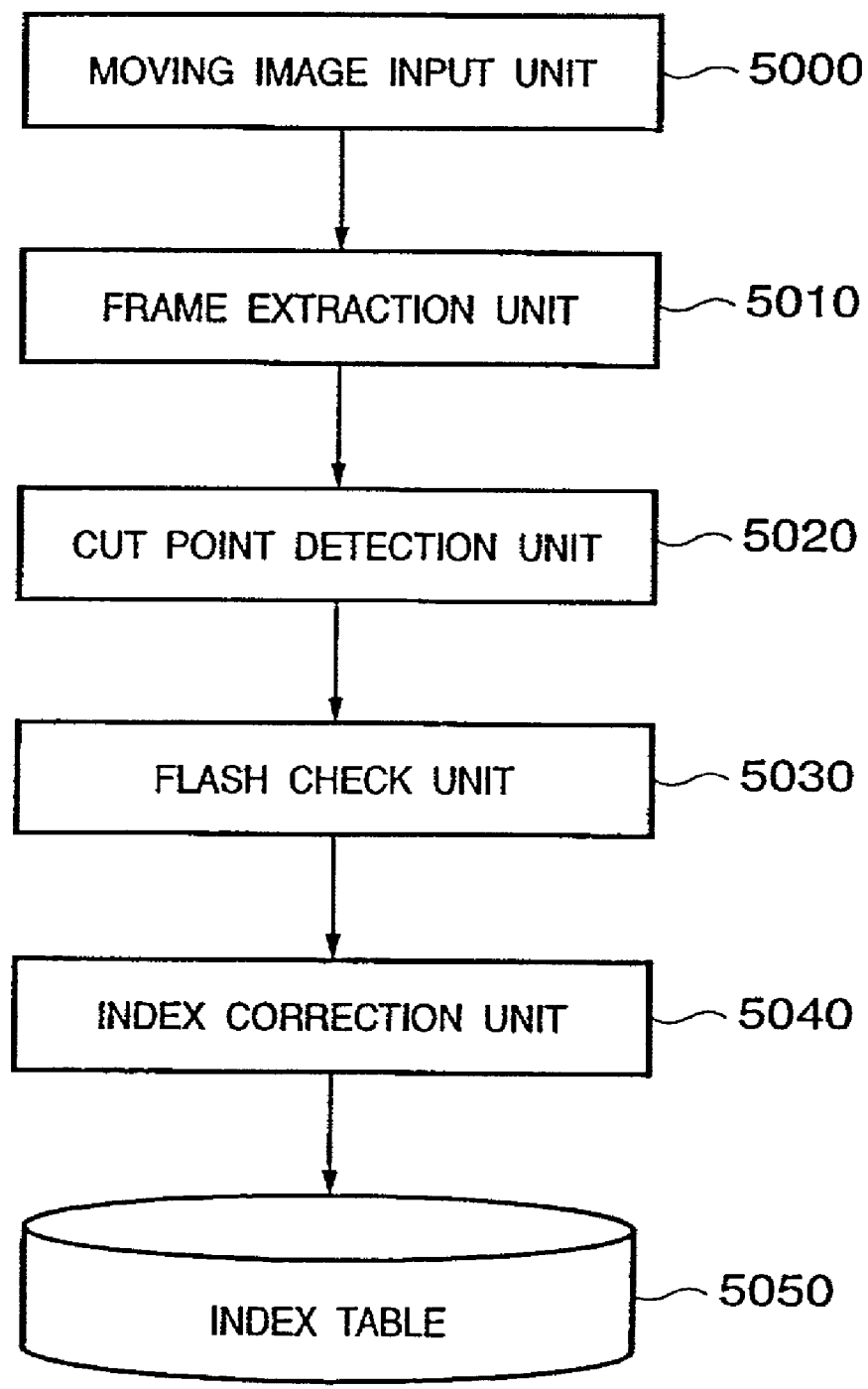
FIG. 8 is a block diagram showing the functional arrangement of a moving image processing apparatus of the third embodiment.

FIG. 8 is a block diagram showing the functional arrangement of a moving image processing apparatus of the third embodiment.

Referring to FIG. 8, reference numeral 5000 denotes a moving image input unit for inputting a moving image captured from the video camera 110, VTR 112, or the like via the video interface 109 or a moving image captured from a device on the network via the network interface 108. Reference numeral 5010 denotes a frame extraction unit for extracting frames (images) that form a moving image in turn. Reference numeral 5020 denotes a cut point detection unit for detecting a cut point frame in the moving image. Reference numeral 5030 denotes a flash check unit for checking a flash portion in the moving image. Reference numeral 5040 denotes an index correction unit for correcting index information of a frame as the output result of the cut point detection unit 5020 using the output result of the flash check unit 5030. Reference numeral 5050 denotes an index table which stores index information corrected by the index correction unit 5040 in the form of table. This index table 5050 is stored in, e.g., the RAM 103.

The processing sequence of a cut point detection function of the moving image processing apparatus of the third embodiment with the aforementioned arrangement will be explained below using FIG. 9.

Figure 9:
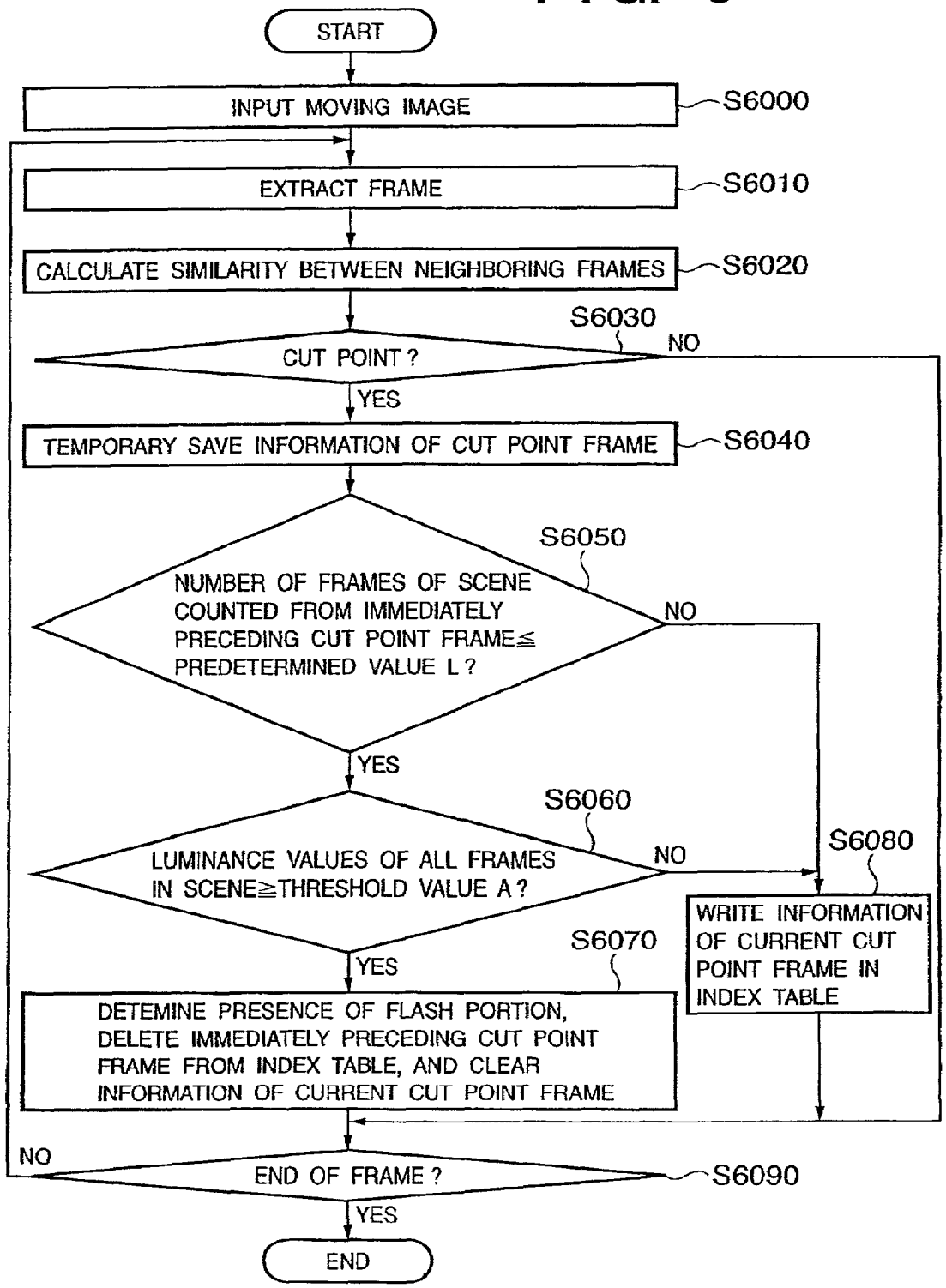
FIG. 9 is a flow chart showing the processing sequence of a cut point detection function of the third embodiment.

FIG. 9 is a flow chart showing the processing sequence of the cut point detection function of the third embodiment.

In step S6000, the moving image input unit 5000 inputs a moving image to be processed. In step S6010, the frame extraction unit 5010 extracts each frame from the moving image to be processed, and sends it to the cut point detection unit 5020. In step S6020, the cut point detection unit 5020 calculates inter-frame similarity distances between the frame of interest and a previous frame group in turn to detect a cut point frame. The previous frame group includes one or a plurality of frames. Hence, for the first frame of the moving image, this process starts after a required number of frames are extracted. An algorithm of the inter-frame similarity distance computation is not particularly limited. For example, the method described in the paragraph of the cut point detection unit 4030 of the second embodiment may be used. In step S6030, the cut point detection unit 5020 checks the presence/absence of detection of a cut point frame on the basis of the inter-frame similarity distance computation results. If a cut point frame is detected (YES in step S6030), the flow advances to step S6040. On the other hand, if a cut point frame is not detected (NO in step S6030), the flow jumps to step S6090.

In step S6040, information (e.g., the frame ID and frame feature amount) of the cut point frame is held on the RAM 103. It is checked in step S6050 if the number of frames of a scene counted from the previous cut point frame is equal to or smaller than a predetermined value L. Note that the number of frames counted from the previous cut point frame can be obtained by calculating the difference between the frame ID of the previous cut point frame and that of the current cut point frame by looking up the index table 5050 (to be described later). However, in case of the first cut point frame of the moving image, the head of the moving image is considered as the previous cut point frame. The predetermined value L indicates a predetermined number of frames which may be continuously influenced by flash light. This value is obtained by experiments and is preferably set to indicate around five frames although it is not particularly limited. If flash light is emitted, frames with high luminance appear under the influence of the flash light, as shown in, e.g., FIG. 4. At this time, a frame at a point (a) as the beginning of the influence of flash light, and a frame at a point (b) after the end of the influence of flash light have large inter-frame similarity distances due to the luminance differences from their immediately preceding frames, and are detected to be cut point frames. That is, if a flash portion is present, cut point frames are detected before and after that scene. Hence, when the duration between the cut point frames (the duration of the scene) is equal to or smaller than the predetermined value L, it is estimated that a flash portion is present.

Therefore, if it is determined in step S6050 that the number of frames is equal to or smaller than the predetermined value L (YES in step S6050), the flow advances to step S6060. On the other hand, if the number of frames is larger than the predetermined value L (NO in step S6060), a non-flash portion is determined, and the flow advances to step S6080. In step S6080, the flash check unit 5030 sends the cut point frame information and check result to the index correction unit 5040. The index correction unit 5040 stores the cut frame information in the index table 5050. The index table stores the frame IDs of cut point frames, as shown in FIG. 7.

Figure 4:
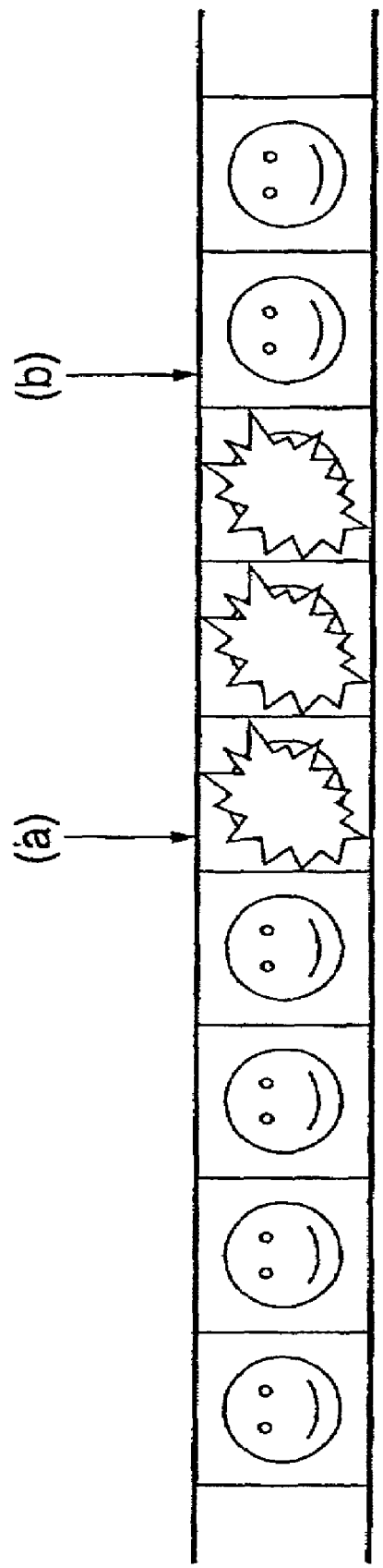
FIG. 4 shows an example when a flash portion is present.

On the other hand, it is checked in step S6060 if the luminance values of all frames in a scene of interest are equal to or larger than a threshold value A. If the scene includes flash light, the frames in the scene has high luminance, as shown in FIG. 4. Of course, since the current cut point frame (point (b) in FIG. 4) should be a frame free from any influence, it is excluded from the scene to be checked. Hence, the threshold value A must have a sufficiently large value. This value is obtained by experiments, and is not particularly limited.

If it is determined in step S6060 that the luminance values of all frames are smaller than the threshold value A (NO in step S6060), the flow advances to step S6080. On the other hand, if the luminance values of all frames are equal to or larger than the threshold value A (YES in step S6060), a flash portion is determined, and the flow advances to step S6070. In step S6070, the flash check unit 5030 clears the information of the current cut point frame, and sends the check result to the index correction unit 5040. The index correction unit 5040 deletes the information of the immediately preceding cut point frame from the index table 5050.

It is checked in step S6090 if frames to be processed still remain. If frames to be processed still remain (NO in step S6090), the flow returns to step S6010. On the other hand, if frames to be processed do not remain (YES in step S6090), the processing ends.

As described above, according to the third embodiment, since frames other than cut point frames are excluded on the basis of similarities between neighboring frames, and frames as cut point frame candidates then undergo cut point frame discrimination and flash detection again, detection errors of cut point detection due to flash light can be eliminated with high precision.

In the first to third embodiments, frame IDs assigned from the head of the moving image are used to indicate frame positions. Alternatively, a playback time from the head of the moving image may be used, and any other values may be used as long as each frame in the moving image can be specified.

Flash detection and cut point detection use luminance values, but any other kinds of information that pertain to brightness may be used instead. For example, even a simple sum of R, G, and B intensities may not largely influence the processing result if a threshold value is appropriately selected. Especially, only a G signal that largely contributes to luminance may be used.

In flash detection of the third embodiment, all pixels in a frame need not be used. For example, luminance, a simple sum of R, G, and B data, or the like may be calculated on the basis of feature amounts, e.g., average colors for respective blocks described in step S6020.

In the second and third embodiments, the index table is stored in the RAM 103. However, the present invention is not limited to this, and the index table may be output via the network. Also, when this apparatus is built in another apparatus, the index table may be output via a memory.

In the second embodiment, when the cut point frame matches the change point frame, the index correction unit 4040 determines a recognition error due to flash light, and executes a decimation process. However, in some cut point frame detection algorithm, these frame may not strictly match. In such case, when a given scene has a cut point frame and a duration nearly equal to that between neighboring change point frames, information that pertains to the cut point frame of that scene can be removed.

Figure 10:
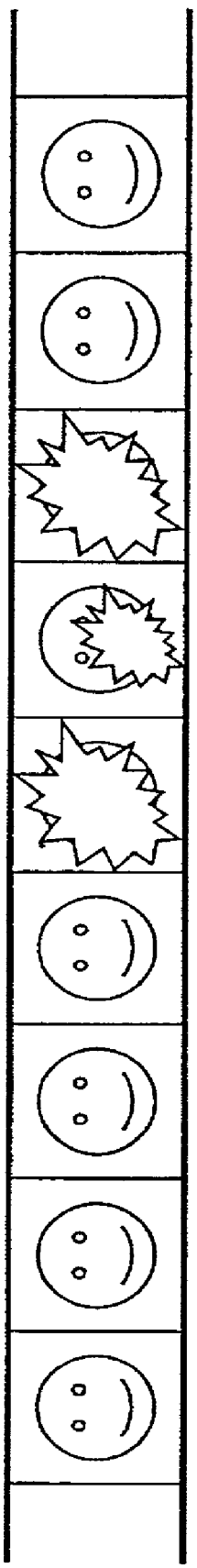
FIG. 10 shows an example when a flash portion is present.

In the third embodiment, the presence of flash light in a scene is determined if it is determined in step S6060 that the luminance values of all frames in the scene of interest are equal to or larger than the threshold value A. However, the influence of flash light is not always uniformly high, and often becomes relatively weak, as shown in FIG. 10. In such case, the threshold value A must be set at a relatively small value, resulting in close discrimination. To cope with such case, if the number of frames that have exceeded the threshold value A in the scene occupies a sufficiently high ratio (predetermined ratio) in the scene duration, a flash portion may be determined. Alternatively, the average of the luminance values of all frames in the scene may be computed, and may be compared with the threshold value A.

Fourth Embodiment

Another processing sequence of the flash detection function implemented by the moving image processing apparatus of the first embodiment will be explained below using FIGS. 11A and 11B.

Figure 11A:
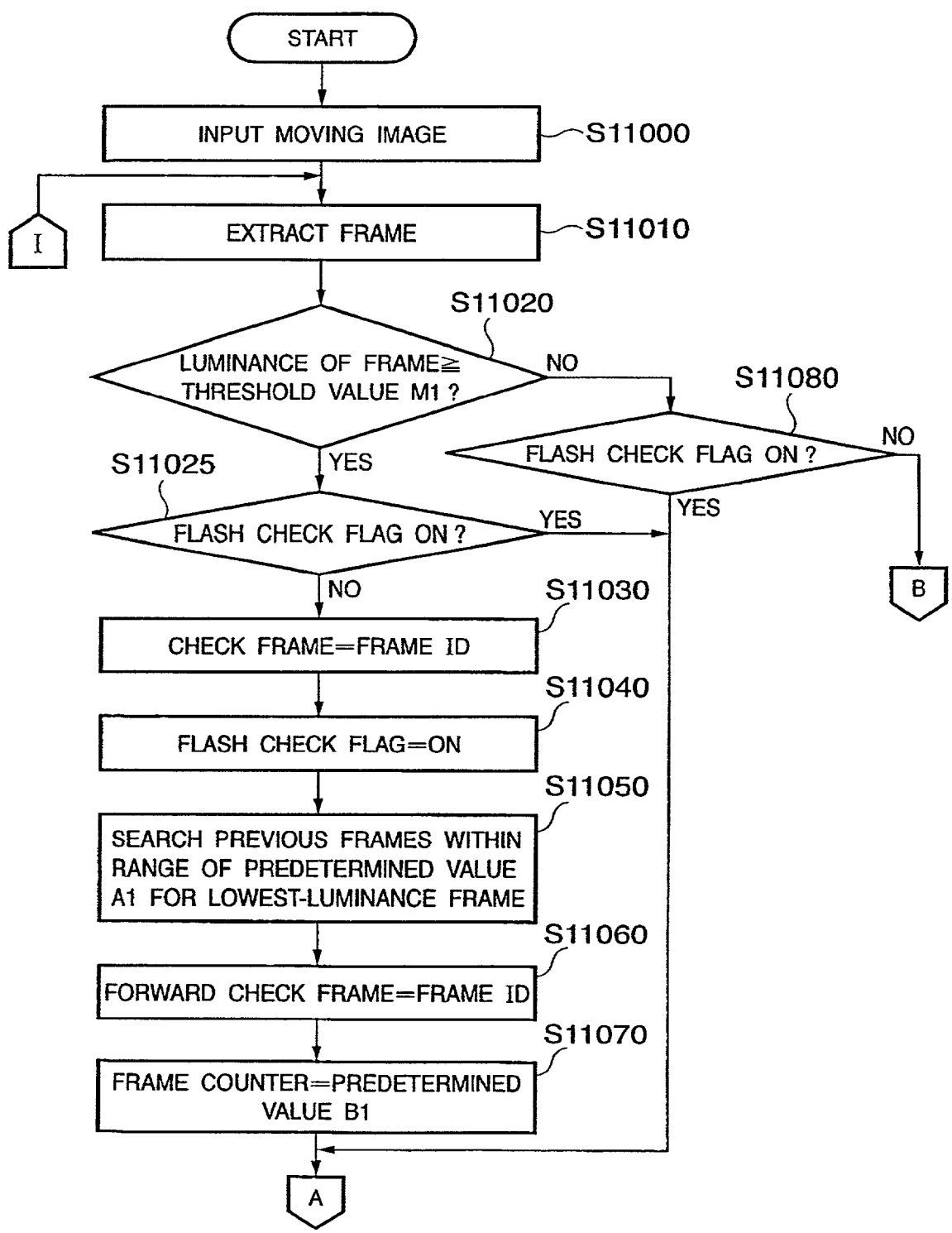
FIG. 11A is a flow chart showing the processing sequence of a flash detection function of the fourth embodiment.
Figure 11B:
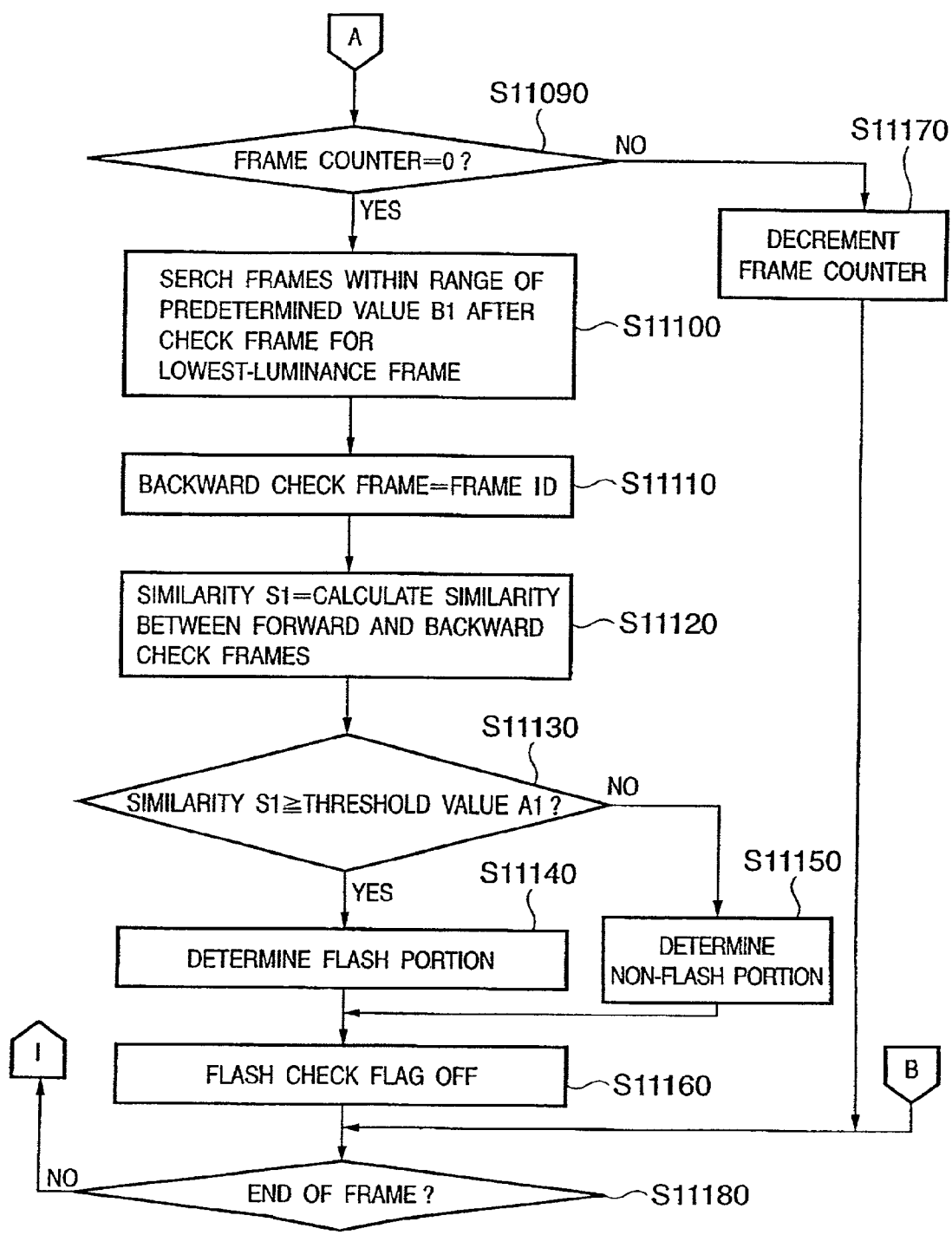
FIG. 11B is a flow chart showing the processing sequence of the flash detection function of the fourth embodiment.

FIGS. 11A and 11B are flow charts showing the processing sequence of the flash detection function of the fourth embodiment.

In step S11000, the moving image input unit 2000 inputs a moving image to be processed. In step S11010, the frame extraction unit 2010 extracts each frame from the moving image to be processed, and sends it to the flash check unit 2020. It is checked in step S11020 if the luminance value of the frame of interest is equal to or larger than a threshold value M1. That is, it is checked if the frame of interest can be estimated to be a flash-emitted frame. If flash light has been emitted, the corresponding frame has very high luminance. Hence, the threshold value M1 is a sufficiently large value. This value is obtained by experiments, and is not particularly limited.

If it is determined in step S11020 that the luminance is equal to or higher than the threshold value M1 (YES in step S11020), a flash-emitted frame is determined, and the flow advances to step S11025. On the other hand, if the luminance is lower than the threshold value M1 (NO in step S11020), a frame free from any flash influence is determined, and the flow advances to step S11080.

It is checked in step S11025 if a flash check flag is ON. This is to check if the flash check process is under way. If the flash check process is under way (YES in step S11025), since the subsequent processes in steps S11030 to S11070 are not required, the flow jumps to step S11090. On the other hand, if the flash check process is not executed (NO in step S11025), the flow advances to step S11030.

In step S11030, the current frame ID is set to be a check frame. In step S11040, the flash check flag is set ON. After that, the flash check process is executed. Assuming that a flash portion is present, a frame which is present before the check frame and has luminance that is not so extremely high, i.e., a frame free from any flash influence, is searched for.

Figure 12:
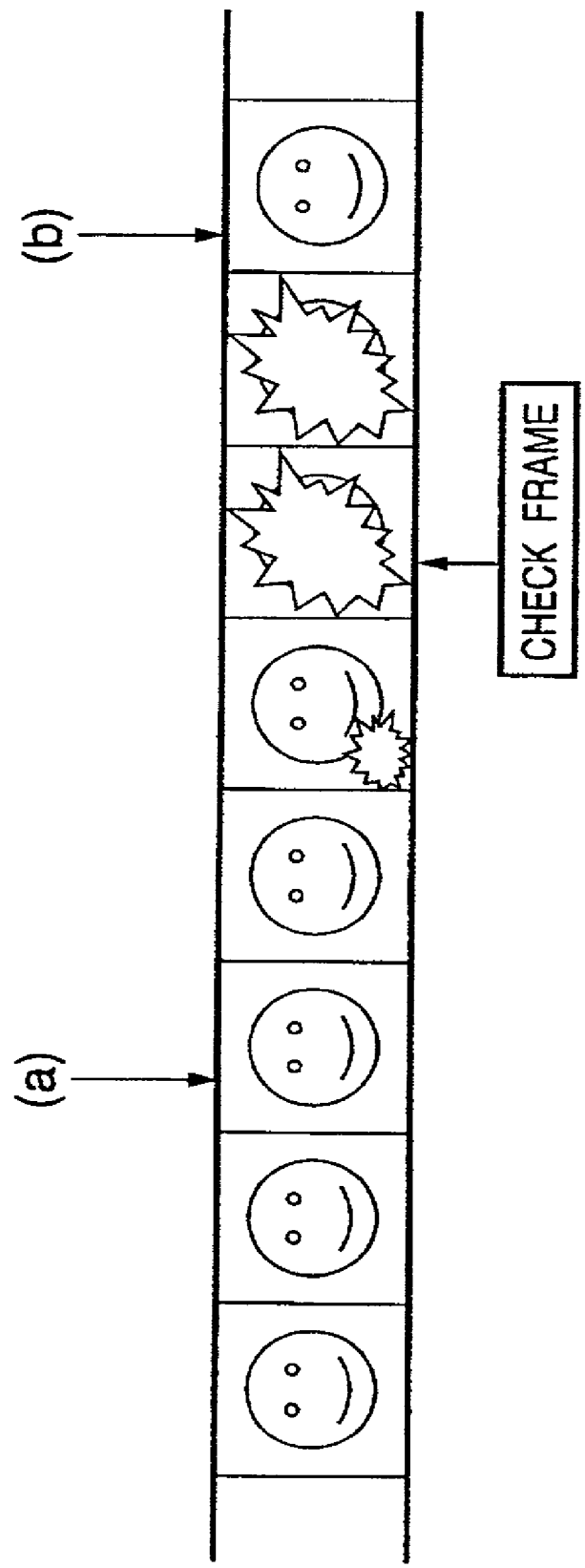
FIG. 12 shows an example when a flash portion is present.

In step S11050, frames within the range defined by a predetermined value A1 before the check frame are searched for a lowest-luminance frame. At this time, if two or more lowest values are present, a frame closer to the check frame is selected (a reason for this will be explained later). Previous frames for the predetermined value A1 are held in the RAM 103 as frame data themselves or only their feature amounts. If the number of extracted frames is smaller than the predetermined value A1 at, e.g., the head of the moving image, the flash check process is exceptionally skipped (not shown). Note that the predetermined value A1 is larger than the number of frames which are continuously influenced by flash light. This value can be obtained by experiments, and is preferably set to indicate around five frames although it is not particularly limited. The reason why the lowest-luminance frame is searched for is that a frame free from any flash influence has lower luminance than frames which are influenced by flash light. The range defined by the predetermined value A1 is searched for that frame for the following reason. As shown in FIG. 12, a frame immediately before the check frame is not detected in step S11020, since it is only partially influenced by flash light and has low luminance as a whole. However, this frame is also influenced by flash light, and the aforementioned search is done to detect such frame.

In step S11060, the frame ID of the lowest-luminance frame is set to be a forward check frame. Then, a frame which is present after the check frame and has luminance that is not so extremely high, i.e., is free from any flash influence is searched for. In step S11070, a predetermined value B1 that defines a search range is set in a frame counter as preparation for that search process.

If it is determined in step S11020 that the frame of interest is free from any flash influence, it is checked in step S11080 if the flash check flag of the frame to be processed is ON. That is, it is checked if the flash check process is under way. If the flash check process is under way (YES in step S11080), since the forward check frame has already been set, the flow advances to step S11090. On the other hand, if the flash check process is not executed (NO in step S11080), the flow advances to step S11180.

It is checked in step S11090 if the frame counter is zero. If the frame counter is not zero (NO in step S11090), this indicates that frames for the predetermined value B1 as the search range have not been received from the frame extraction unit 2010 yet, and the flow advances to step S11170 to decrement the frame counter. The flow then advances to step S11180.

On the other hand, if it is determined in step S11090 that the frame counter is zero (YES in step S11090), frames for the predetermined value B1 as the search range have already been extracted. These frames are held in the RAM 103 as frame data themselves or only their feature amounts. In step S11100, frames within the range defined by the predetermined value B1 after the check frame are searched for a lowest-luminance frame.

If two or more lowest values are found in this case, a frame closer to the check frame is selected (a reason for this will be explained later). Note that the predetermined value B1 is larger than the number of frames which are continuously influenced by flash light. This value can be obtained by experiments, and is preferably set to indicate around five frames although it is not particularly limited. The reason why the lowest-luminance frame is searched for is that a frame free from any flash influence has lower luminance than frames which are influenced by flash light. Also, the reason why the range defined by the predetermined value B1 is searched is that frames influenced by flash light often appear successively.

In step S11110, the frame ID of the lowest-luminance frame is set to be a backward check frame. In step S11120, a similarity between the forward and backward check frames is computed, and is set in a similarity S1. Note that the similarity between frames is obtained by computing an inter-frame similarity distance, and expressing that distance in percentage (100%=perfect match) As for the inter-frame similarity distance computation, its algorithm is not particularly limited. For example, the method described in the paragraph of the cut point detection unit 4030 of the second embodiment may be used.

Figure 13:
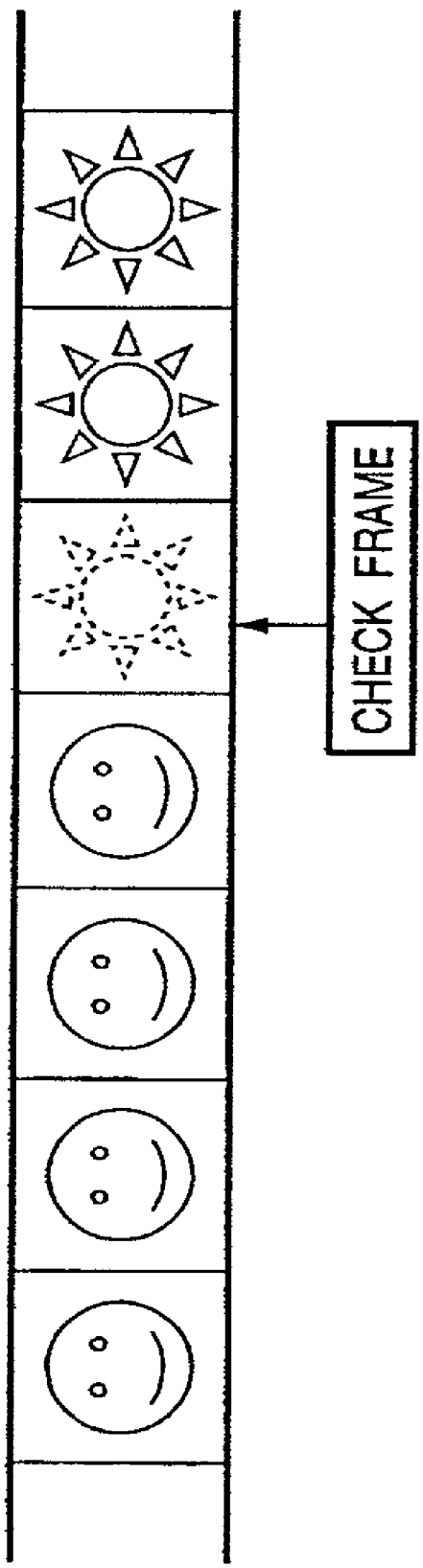
FIG. 13 shows an example of a scene change using a special effect.

It is checked in step S11130 if the similarity S1 is equal to or larger than the threshold value A1. This is for the following reason. If a flash portion is found, the forward check frame (point (a) in FIG. 12) and backward check frame (point (b) in FIG. 12), i.e., frames which are free from any flash influence before and after the check frame have a high similarity since they are successive videos. However, a special effect that changes a scene after the frame becomes bright instantaneously, as shown in FIG. 13, is different from a flash portion. In such case, although the check frame has very high luminance, frames before and after the check frame have a low similarity since discontinuous videos are compared. Therefore, the threshold value A1 must have a very large value. This numerical value is preferably set to be around 80% although it is not particularly limited. The reason why a frame closer to a cut point frame is selected if two or more frames having the lowest luminance value are found in steps S11050 and S11100 is to avoid close discrimination using the threshold value A1 since a video changes and the similarity lowers consequently as it is separate from the cut point frame.

If it is determined in step S11130 that the similarity S1 is equal to or higher than the threshold value A1 (YES in step S11130), the flow advances to step S11140, and it is determined that the frame to be processed is a flash frame. On the other hand, if the similarity S1 is lower than the threshold value A1 (NO in step S11130), the flow advances to step S11150, and it is determined that the frame to be processed is not a flash frame.

In step S11160, the flash check flag is set OFF since the flash check process is complete. It is checked in step S11180 if frames to be processed still remain. If frames to be processed still remain (NO in step S11180), the flow returns to step S11010. On the other hand, if frames to be processed do not remain (YES in step S11180), the processing ends.

As described above, according to the fourth embodiment, even when a flash portion is hard to check (e.g., three or more frames influenced by flash light continue), a flash portion can be detected with high precision. Furthermore, since frame comparison need only be made between neighboring frames, no new amount such as a scene change ratio is required, thus suppressing the computation cost.

Fifth Embodiment

Detection errors of cut points due to flash light can be efficiently removed by exploiting the flash detection result explained in the third embodiment by the process used in the second embodiment.

Sixth Embodiment

Figure 14:
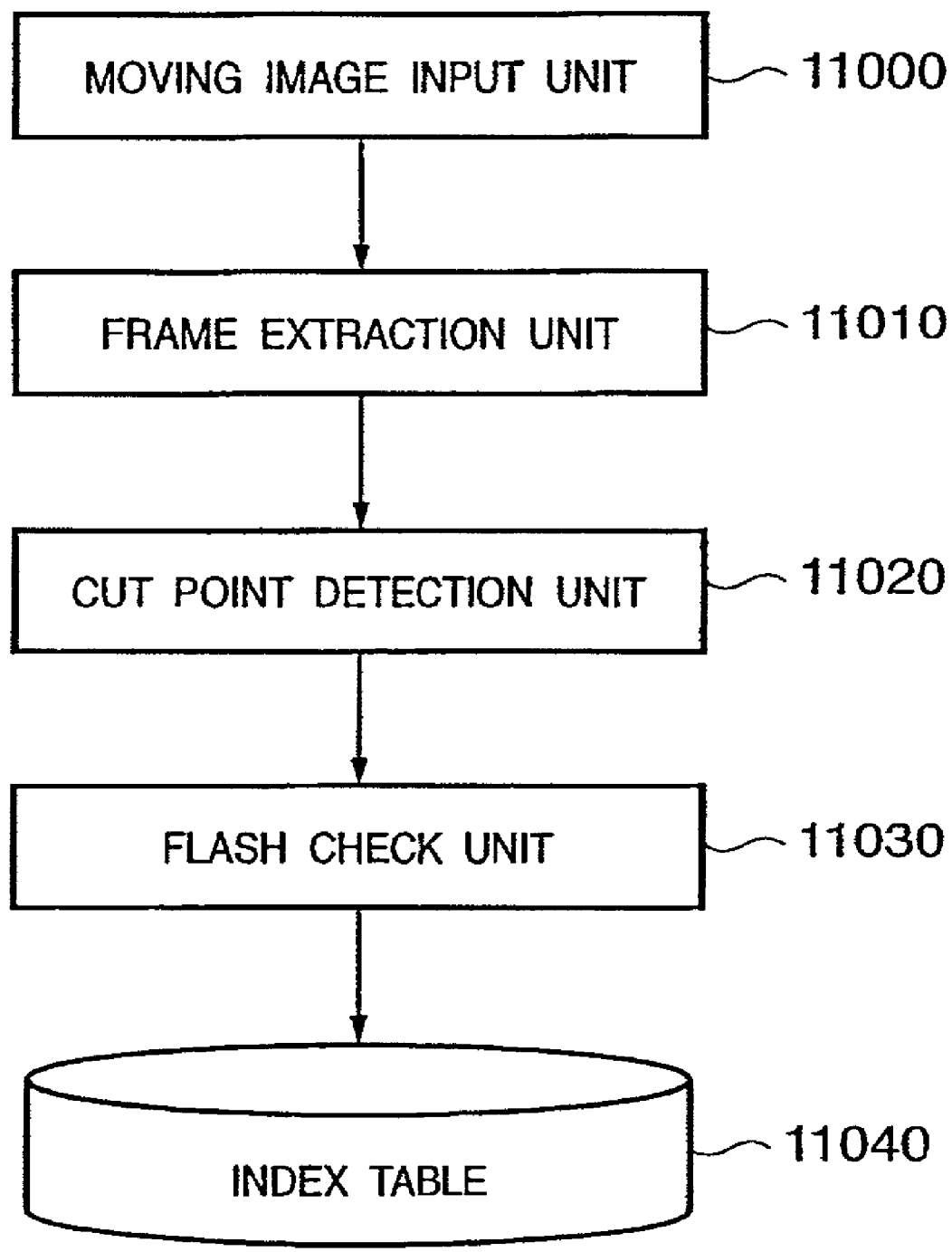
FIG. 14 is a block diagram showing the functional arrangement of a moving image processing apparatus of the sixth embodiment.
Figure 15A:
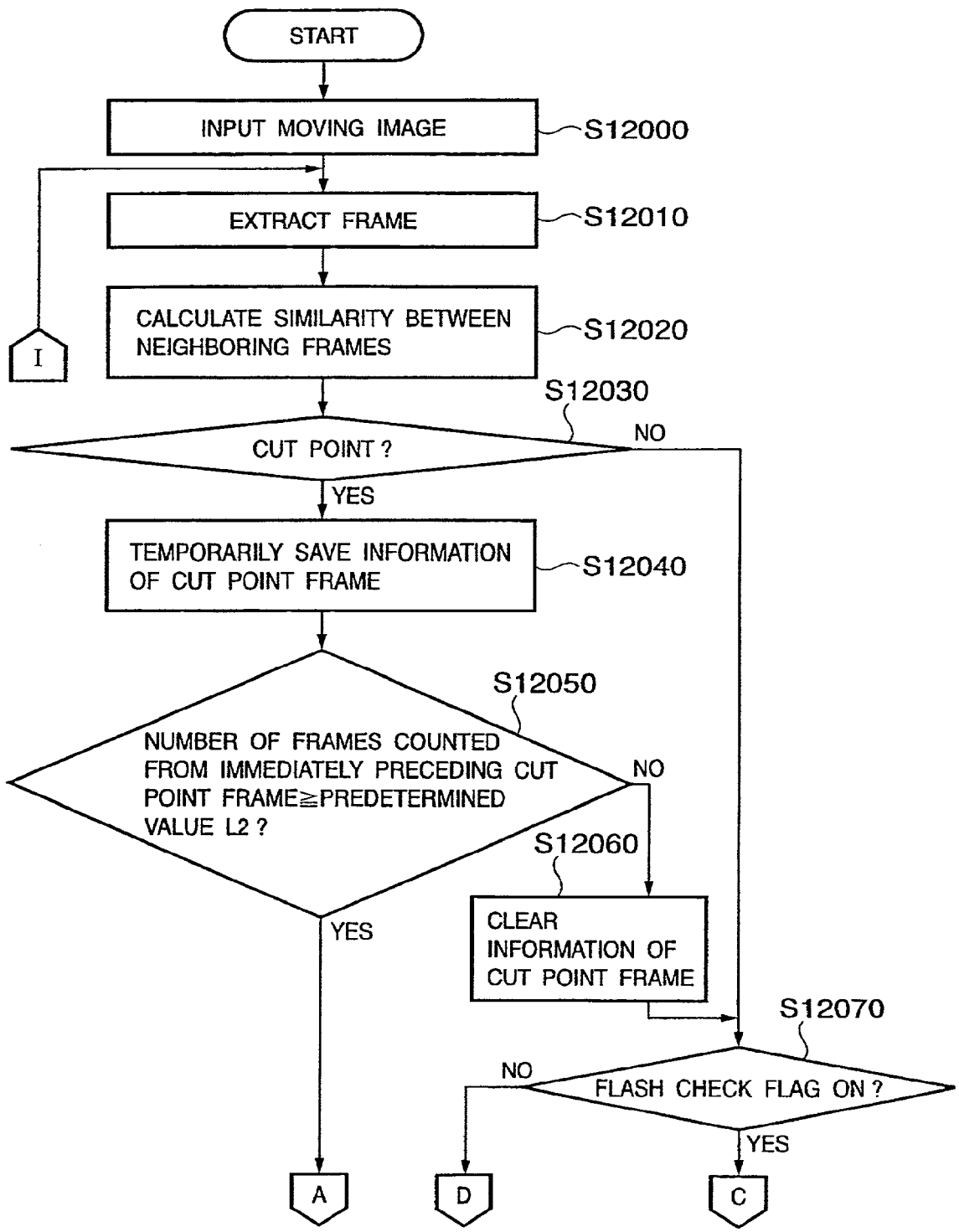
FIG. 15A is a flow chart showing the processing sequence of a cut point detection function of the sixth embodiment.
Figure 15C:
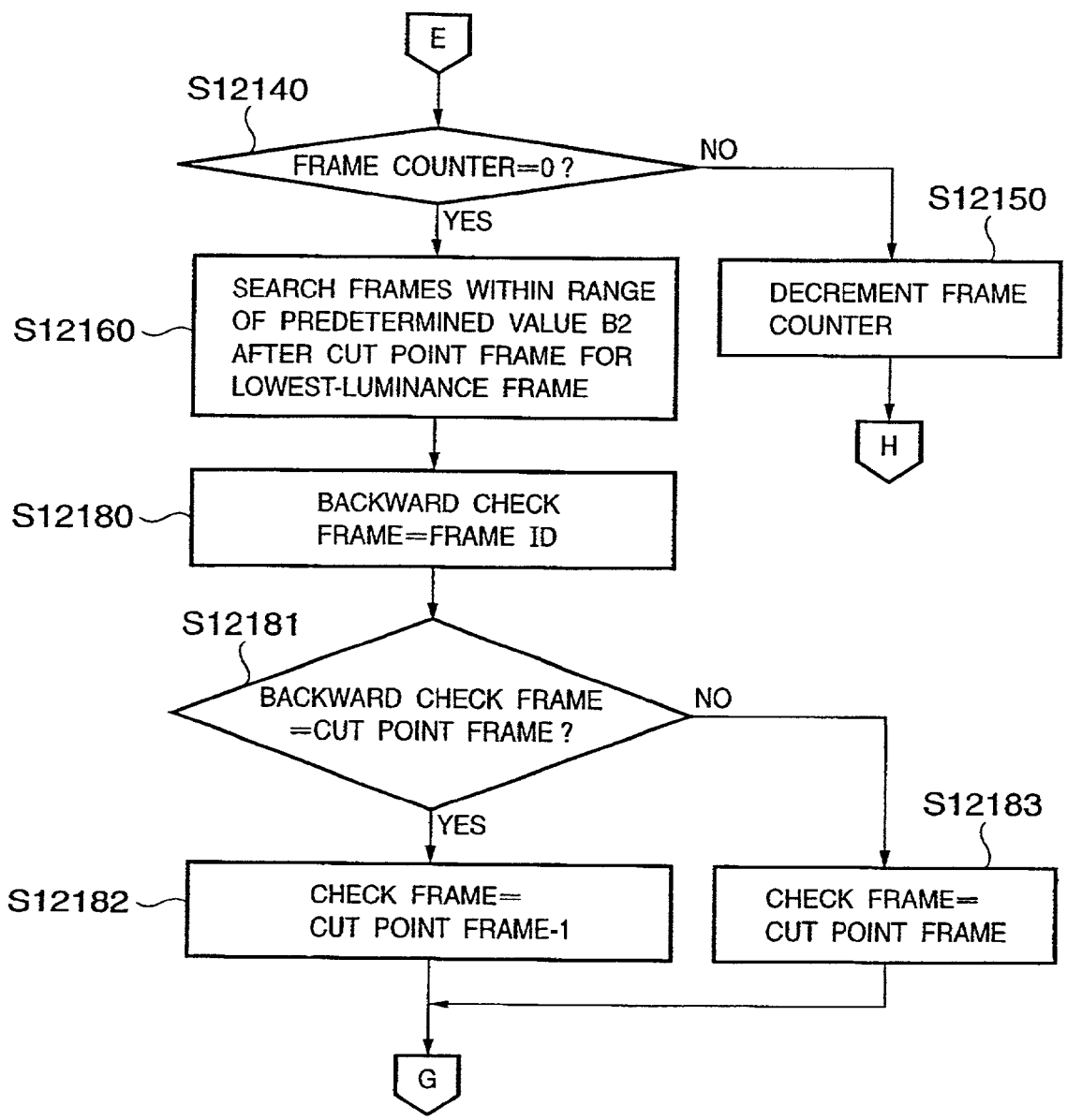
FIG. 15C is a flow chart showing the processing sequence of the cut point detection function of the sixth embodiment.
Figure 15D:
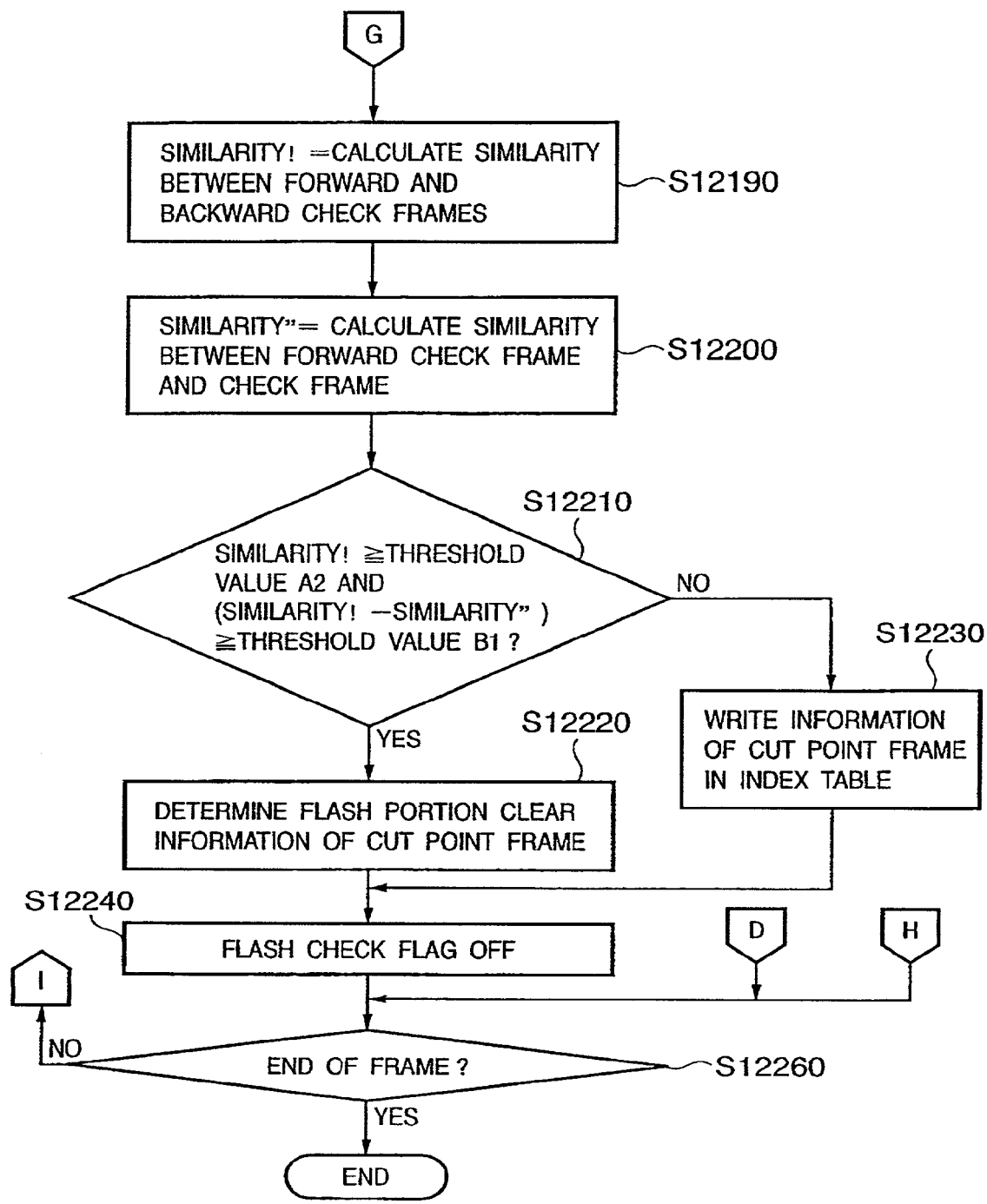
FIG. 15D is a flow chart showing the processing sequence of the cut point detection function of the sixth embodiment.

FIG. 14 is a block diagram showing the functional arrangement of a moving image processing apparatus of the sixth embodiment.

Referring to FIG. 14, reference numeral 11000 denotes a moving image input unit for inputting a moving image captured from the video camera 110, VTR 112, or the like via the video interface 109 or a moving image captured from a device on the network via the network interface 108. Reference numeral 11010 denotes a frame extraction unit for extracting frames (images) that form a moving image in turn. Reference numeral 11020 denotes a cut point detection unit for detecting a cut point frame in the moving image. Reference numeral 11030 denotes a flash check unit for checking a flash portion, and correcting the detection result of the cut point detection unit 11020 in accordance with the checking result. Reference numeral 11040 denotes an index table which stores index information corrected by the index correction unit 11040 in the form of table. This index table 11040 is stored in, e.g., the RAM 103.

The processing sequence of a cut point detection function of the moving image processing apparatus of the sixth embodiment with the above arrangement will be described below using FIGS. 15A to 15D.

FIGS. 15A to 15D are flow charts showing the processing sequence of the cut point detection function of the sixth embodiment.

In step S12000, the moving image input unit 11000 inputs a moving image to be processed. In step S12010, the frame extraction unit 11010 extracts each frame from the moving image to be processed, and sends it to the cut point detection unit 11020. In step S12020, the cut point detection unit 11020 calculates inter-frame similarity distances between the frame of interest and a previous frame group in turn to detect a cut point frame. The previous frame group includes one or a plurality of frames. Hence, for the first frame of the moving image, this process starts after a required number of frames are extracted. An algorithm of the inter-frame similarity distance computation is not particularly limited. For example, the method described in step S11120 of the fourth embodiment may be used. In step S12030, the cut point detection unit 11020 checks the presence/absence of detection of a cut point frame on the basis of the inter-frame similarity distance computation results. If a cut point frame is detected (YES in step S12030), the flow advances to step S12040. On the other hand, if a cut point frame is not detected (NO in step S12030), the flow advances to step S12070.

In step S12040, information (e.g., the frame ID and frame feature amount) of the cut point frame is held on the RAM 103. It is checked in step S12050 if the number of frames of a scene counted from the previous cut point frame is equal to or smaller than a predetermined value L2. Note that the number of frames counted from the previous cut point frame can be obtained by calculating the difference between the frame ID of the previous cut point frame and that of the current cut point frame by looking up the index table 11040 (to be described later). However, in case of the first cut point frame of the moving image, the head of the moving image is considered as the previous cut point frame. The predetermined value L2 defines a shortest duration (predetermined duration) which is recognized as a scene. For example, 10 frames or less at a frame rate of 30 frames per sec correspond to ⅓ sec or less, and are not long enough for a human being to detect.

In this way, the predetermined value L2 can be determined based on the human visual characteristics. The predetermined value L2 must be larger than predetermined values A2 and B2 (to be described later). This is because the predetermined values A2 and B2 respectively define flash check search ranges, and if this search range includes a cut point frame, the flash check process is disturbed. The predetermined value L2 is not particularly limited as long as the aforementioned two conditions are satisfied, and is preferably set to be around 10 frames.

If it is determined in step S12050 that the number of frames is not equal to or larger than the predetermined value L2 (NO in step S12050), a frame determined as a cut point in step S12030 is not accepted as a cut point frame, and the information of the cut point frame temporarily saved in step S12040 is cleared in step S12060. It is checked in step S12070 if a flash check flag is ON. That is, it is checked if the flash check process is under way. This is because a point (b) in FIG. 16 may be determined to be a new cut point frame during the flash check process of the cut point frame shown in FIG. 16.

On the other hand, if it is determined in step S12050 that the number of frames is equal to or larger than the predetermined value L2 (YES in step S12050), the flow advances to step S12090, and the flash check flag is set ON. The flash check flag indicates that the flash check process is under way. After that, the flash check process is executed. Assuming that a flash portion is present, a frame which is present before the check frame and has luminance that is not so extremely high, i.e., a frame free from any flash influence, is searched for.

In step S12100, frames within the range defined by a predetermined value A2 before the check frame are searched for a lowest-luminance frame. At this time, if two or more lowest values are present, a frame closer to the check frame is selected (the reason for this will be explained later). Previous frames for the predetermined value A2 are held in the RAM 103 as frame data themselves or only their feature amounts. Note that the predetermined value A2 is larger than the number of frames which are continuously influenced by flash light. This value can be obtained by experiments, and is preferably set to indicate around five frames although it is not particularly limited.

Figure 16:
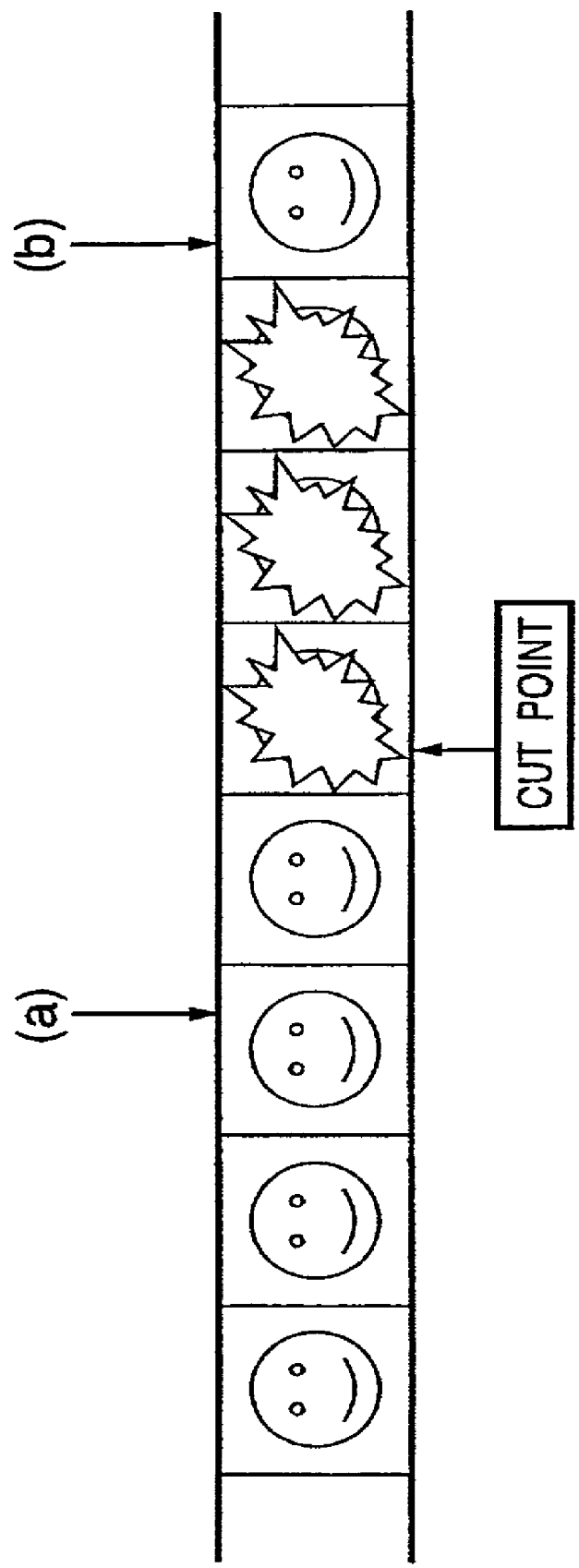
FIG. 16 shows an example of a detection error due to the presence of a flash portion.
Figure 17:
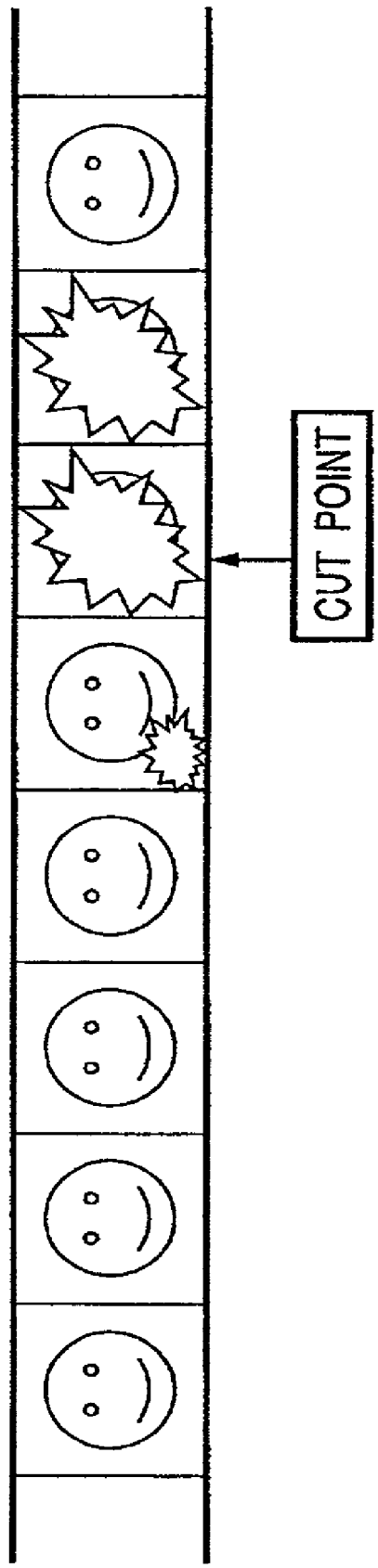
FIG. 17 shows an example of a detection error due to the presence of a flash portion.
Figure 18:
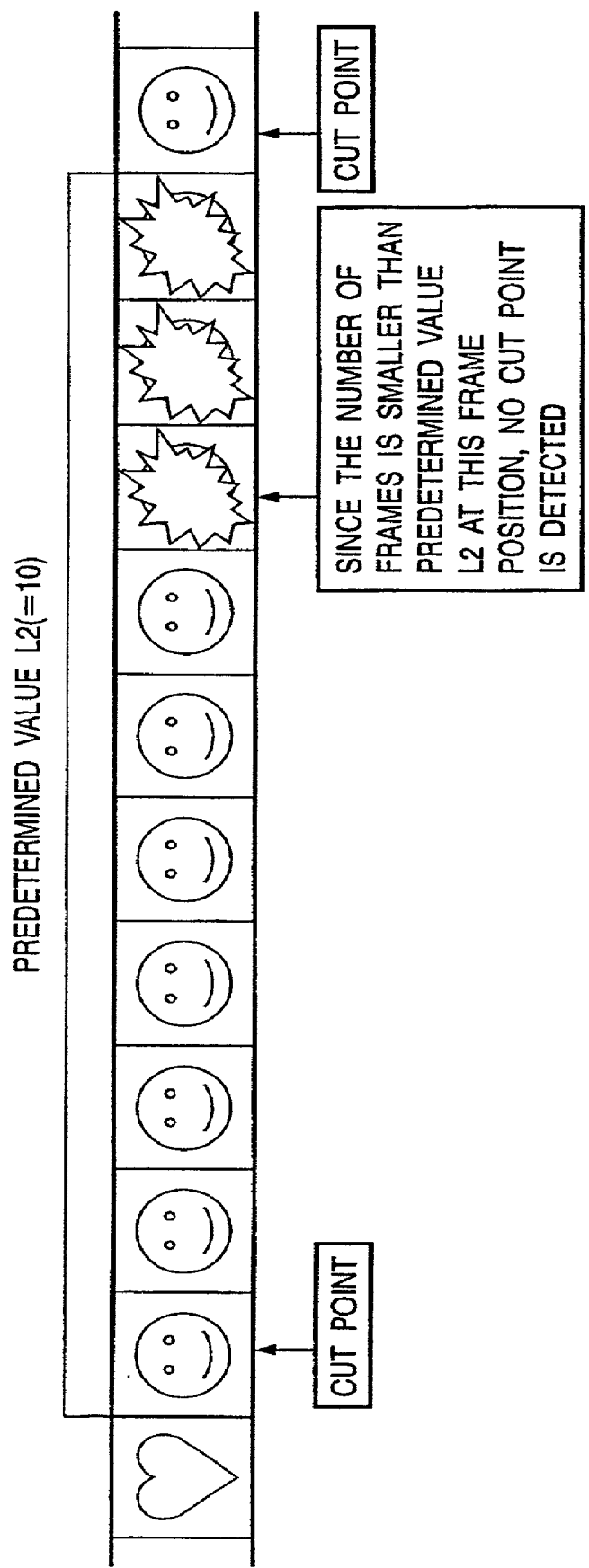
FIG. 18 shows an example of a detection error due to the presence of a flash portion.

The reason why the lowest-luminance frame is searched for is that a frame free from any flash influence has lower luminance than frames which are influenced by flash light. The range defined by the predetermined value A2 is searched for that frame for the following reason. As shown in FIG. 16, when a detection error due to flash light has occurred, a frame immediately before the cut point frame is often free from any influence. However, a frame immediately before the cut point frame may be influenced by flash light if that frame is only partially influenced by flash light and is not detected as a cut point frame, as shown in FIG. 17. Furthermore, a cut point frame may often be detected immediately after a frame influenced by flash light due to the lower limit of the scene duration in step S12050, as shown in FIG. 18.

In step S12120, the frame ID of the lowest-luminance frame is set to be a forward check frame. Then, a frame which is present after the check frame and has luminance that is not so extremely high, i.e., is free from any flash influence is searched for. In step S12130, a predetermined value B2 that defines a search range is set in a frame counter as preparation for that search process. The flow advances to step S12140.

It is checked in step S12070 if the flash check flag is ON. That is, it is checked if the flash check process is under way. If the flash check process is under way (YES in step S12070), since the forward check frame has already been set, the flow advances to step S12140. On the other hand, if the flash check process is not executed (NO in step S12070), since the frame of interest is neither a cut point nor flash frame, the flow advances to step S12260.

It is checked in step S12140 if the frame counter is zero. If the frame counter is not zero (NO in step S12140), this indicates that frames for the predetermined value B2 as the search range have not been received from the frame extraction unit 11010 yet, and the flow advances to step S12150 to decrement the frame counter. The flow then advances to step S12260.

On the other hand, if it is determined in step S12140 that the frame counter is zero (YES in step S12140), frames for the predetermined value B2 as the search range have already been extracted. These frames are held in the RAM 103 as frame data themselves or only their feature amounts. In step S12160, frames within the range defined by the predetermined value B2 after the cut point frame are searched for a lowest-luminance frame. If two or more lowest values are found in this case, a frame closer to the check frame is selected (the reason for this will be explained later). Note that the predetermined value B2 is larger than the number of frames which are continuously influenced by flash light. This value can be obtained by experiments, and is preferably set to indicate around five frames although it is not particularly limited.

The reason why the lowest-luminance frame is searched for is that a frame free from any flash influence has lower luminance than frames which are influenced by flash light. Also, the reason why the range defined by the predetermined value B2 is searched is that frames influenced by flash light often appear successively. Furthermore, since a frame immediately before the cut point frame is also influenced by flash light, as shown in FIG. 18, the range defined by the predetermined value B2 includes the cut point frame.

In step S12180, the frame ID of the lowest-luminance frame is set to be a backward check frame. It is checked in step S12181 if the backward check frame is equal to the cut point frame. If these frames are equal to each other (YES in step S12181), a frame immediately before the cut point frame is influenced by flash light, as shown in FIG. 18. At this time, the flow advances to step S12182, and the frame before the cut point frame is set to be a check frame (the reason for this will be explained later). On the other hand, if the two frames are not equal to each other (NO in step S12181), the flow advances to step S12183, and the cut point frame is set to be a check frame.

In step S12190, a similarity between the forward and backward check frames is computed, and is set in similarity ①. As for the inter-frame similarity distance computation, its algorithm is not particularly limited, and the method described in the paragraph of the cut point detection unit 11020 may be used. The similarity is obtained by expressing the distance obtained by the above method in percentage (100%=perfect match). Likewise, a similarity between the forward check frame and check frame is computed and is set in similarity ② in step S12200.

Figure 19:
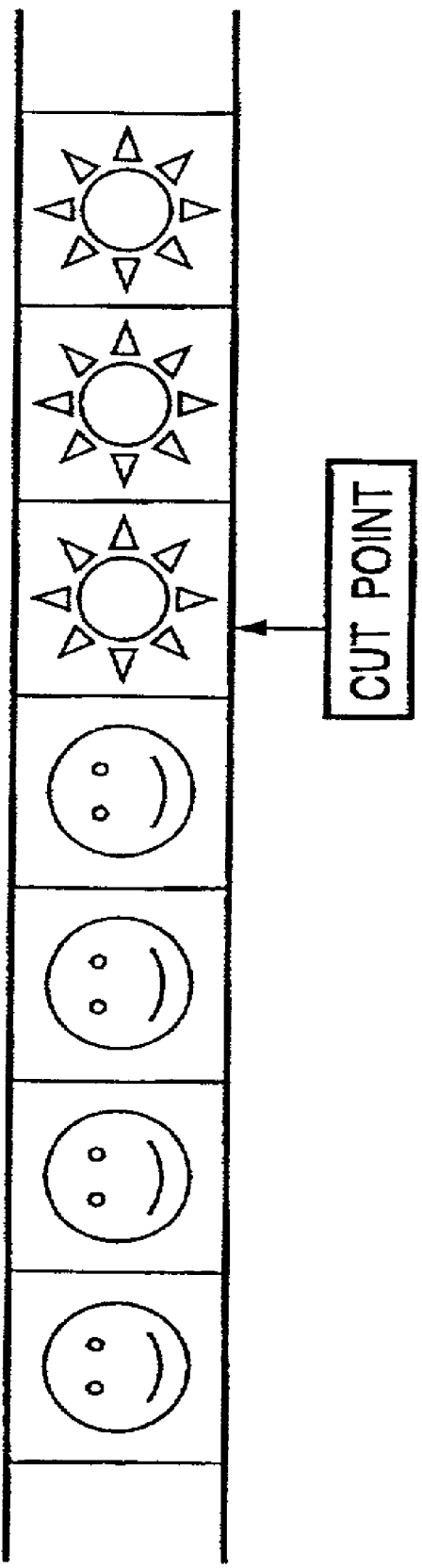
FIG. 19 shows an example of a normal cut point.

It is checked in step S12210 if the cut point detection unit 11020 has made any detection error due to the influence of flash light. As the first condition, it is checked if similarity ① is equal to or larger than a threshold value A2. This is for the following reason. If the cut point frame is a detection error due to flash light, the forward check frame (point (a) in FIG. 16) and backward check frame (point (b) in FIG. 16), i.e., frames which are free from any flash influence before and after the cut point frame have a high similarity since they are successive videos. However, in case of a normal cut point frame, as shown in FIG. 19, frames before and after the cut point frame have a low similarity since discontinuous videos are compared. Therefore, the threshold value A2 must have a very large value. This numerical value is preferably set to be around 80% although it is not particularly limited.

The reason why a frame closer to a cut point frame is selected if two or more frames having the lowest luminance value are found in steps S12100 and S122160 is to avoid close discrimination using the threshold value A2 since a video changes and the similarity is lowered consequently as it is separate from the cut point frame. Sufficiently high precision can be assured if only the first condition is satisfied. However, the following situation may take place. For example, in case of a video with quick motion, similarity ① becomes relatively low. Hence, the threshold value A2 must be set to be a relatively small value, and the difference from the normal cut point frame is reduced.

To avoid such situation, it is checked as the second condition if a value obtained by subtracting similarity ② from similarity ① is equal to or larger than the threshold value B2. This is for the following reason. If frames are influenced by flash light, as shown in FIG. 16, similarity ① is high, but since the check frame is influenced by the flash light, similarity ② is low. However, in case of a normal cut point frame, both similarities ① and ② are low, as shown in FIG. 19. In case of FIG. 18, the cut point frame is not influenced by flash light. Hence, a frame before the cut point frame is set to be a check frame (step S12182) to prepare for the checking process of the second condition. The threshold value B2 is determined by experiments. This value is preferably set to be around 15% although it is not particularly limited. If these conditions are satisfied (YES in step S12210), the flow advances to step S12220 to clear the temporarily saved information of the cut point frame since it is determined that a frame detected as a cut point by the cut point detection unit 11020 is a detection error due to flash light.

If the conditions in step S12210 are not satisfied (NO in step S12210), it is determined that the cut point frame is not a detection error due to flash light, and the flow advances to step S12230. In step S12230, the temporarily saved information of the cut point frame is stored in the index table 11040. The index table 11040 stores the frame IDs of cut point frames, as shown in FIG. 7.

In step S12240, the flash check flag is set OFF since the flash check process is complete. It is checked in step S12260 if frames to be processed still remain. If frames to be processed still remain (NO in step S12260), the flow returns to step S12010. On the other hand, if frames to be processed do not remain (YES in step S12260), the processing ends.

As described above, according to the sixth embodiment, as frames other than cut point frames are excluded on the basis of similarities between neighboring frames, and frames as cut point frame candidates then undergo cut point frame discrimination and flash detection again, detection errors of cut point frames due to flash light can be eliminated with higher precision.

In the fourth to sixth embodiments, frame IDs assigned from the head of the moving image are used to indicate frame positions. Alternatively, a playback time from the head of the moving image may be used, and any other values may be used as long as each frame in the moving image can be specified.

In flash detection and cut point detection, similarities are used. However, the similarity distances themselves may be used as long as an appropriate threshold value is used.

In the fourth embodiment, luminance values are used in steps S11020, S11050, and S11170, but any other kinds of information that pertain to brightness may be used instead. For example, even a simple sum of R, G, and B intensities may not largely influence the processing result if a threshold value is appropriately selected. Especially, only a G signal that largely contributes to luminance may be used.

In the fourth embodiment, a lowest-luminance frame is selected in steps S11050 and S11100. These steps aim at searching for a frame free from any influence of flash light, and the present invention is not limited to such specific method. For example, a threshold value may be set, and forward and backward searches from the check frame may be made to find out frames smaller than this threshold value.

In the sixth embodiment, luminance values are used in steps S12100 and S12160, but any other kinds of information that pertain to brightness may be used instead. For example, even a simple sum of R, G, and B intensities may not largely influence the processing result if a threshold value is appropriately selected. Especially, only a G signal that largely contributes to luminance may be used. Also, all pixels in a frame need not be used. For example, luminance, a simple sum of R, G, and B data, or the like may be calculated on the basis of feature amounts, e.g., average colors for respective blocks described in step S12020.

Furthermore, a lowest-luminance frame is selected in steps S12100 and S12160. These steps aim at searching for a frame free from any influence of flash light, and the present invention is not limited to such specific method. For example, a threshold value may be set, and forward and backward searches from the check frame may be made to find out frames smaller than this threshold value.

In step S12210, the first and second conditions are used. However, only the first condition may be used if the required precision allows.

In step S12210, (similarity ①–similarity ②) $\geq$ threshold value B1 is used as the second condition by exploiting the fact that the frame set as the check frame is heavily influenced by flash light, and similarity ② becomes low. Hence, a condition to check if the luminance of the check frame is extremely high may be used instead. In this case, a threshold value can be obtained by experiments. Of course, this condition may be used together as the third condition.

In step S12210, (similarity ①–similarity ②) $\geq$ threshold value B1 is used as the second condition. Alternatively, similarity ② may be obtained by calculating that between the backward check frame and check frame to check if (similarity ①–similarity ②) $\geq$ threshold value B1. If the check frame is equal to the cut point frame, similarity ② becomes high since videos are continues from the cut point frame in case of a normal cut frame, and the similarity becomes low due to the influence of flash light in case of a flash frame. If a frame before the cut point frame is set as the check frame, similarity ② also lowers in case of a normal cut frame. However, since similarity ① becomes low, (similarity ①–similarity ②)<threshold value B1 holds consequently, and the normal cut point frame can be distinguished from a flash frame.

In the sixth embodiment, the index table is stored in the RAM 103. However, the present invention is not limited to this, and the index table may be output via the network. Also, when this apparatus is built in another apparatus, the index table may be output via a memory.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, that storage medium stores the program codes corresponding to the aforementioned flow charts.

The present invention is not limited to the above embodiments and various changes and modifications can be made within the spirit and scope of the present invention. Therefore, to apprise the public of the scope of the present invention the following claims are made.

What is claimed is:

1. A moving image processing apparatus for detecting a cut point frame in an input moving image, comprising:

calculation means for calculating similarities between neighboring frames in the moving image formed by a plurality of frames;

cut point determination means for determining cut point frames in the moving image on the basis of the similarities calculated by said calculation means;

scene duration determination means for determining if a scene duration between neighboring cut point frames determined by said cut point determination means is smaller than a predetermined value;

determination means for determining the presence/absence of a flash portion in the moving image on the basis of a determination result of said scene duration determination means; and correction means for correcting determination results of said cut point determination means on the basis of the determination result of said determination means, wherein said determination means determines the presence/absence of a flash portion in the moving image on the basis of brightness values between neighboring cut point frames which are determined by said scene duration determination means, and have a duration smaller than a predetermined value, and wherein said determination means determines that a flash portion is present between neighboring cut point frames when the number of frames having brightness values not less than a threshold value in a scene between the neighboring cut point frames occupies a predetermined ratio of the scene duration.

2. The apparatus according to claim 1, wherein the predetermined value is a predetermined number of frames.

3. The apparatus according to claim 1, wherein said determination means determines that a flash portion is present between neighboring cut point frames when brightness values of all frames in a scene between the neighboring cut point frames are not less than a threshold value.

4. The apparatus according to claim 1, wherein said determination means determines that a flash portion is present between neighboring cut point frames when an average of brightness values of all frames in a scene between the neighboring cut point frames is not less than a threshold value.

5. The apparatus according to claim 1, wherein the brightness value is a luminance value.

6. The apparatus according to claim 1, wherein the brightness value includes R, G, and B intensity values.

7. A moving image processing method for detecting a cut point frame in an input moving image, comprising:
   a calculation step of calculating similarities between neighboring frames in the moving image formed by a plurality of frames;
   a cut point determination step of determining cut point frames in the moving image on the basis of the similarities calculated in said calculation step;
   a scene duration determination step of determining if a scene duration between neighboring cut point frames determined in said cut point determination step is smaller than a predetermined value;
   a determination step of determining the presence/absence of a flash portion in the moving image on the basis of a determination result in said scene duration determination step; and
   a correction step of correcting determination results in said cut point determination step on the basis of the determination result in said determination step,
   wherein said determination step determines the presence/absence of a flash portion in the moving image on the basis of brightness values between neighboring cut point frames which are determined in said scene duration determination step, and have a duration smaller than a predetermined value, and
   wherein said determination step determines that a flash portion is present between neighboring cut point frames when the number of frames having brightness values not less than a threshold value in a scene between the neighboring cut point frames occupies a predetermined ratio of the scene duration.

8. The method according to claim 7, wherein the predetermined value is a predetermined number of frames.

9. The method according to claim 7, wherein it is determined in said determination step that a flash portion is present between neighboring cut point frames when brightness values of all frames in a scene between the neighboring cut point frames are not less than a threshold value.

10. The method according to claim 7, wherein it is determined in said determination step that a flash portion is present between neighboring cut point frames when an average of brightness values of all frames in a scene between the neighboring cut point frames is not less than a threshold value.

11. The method according to claim 7, wherein the brightness value is a luminance value.

12. The method according to claim 7, wherein the brightness value includes R, G, and B intensity values.

13. A computer readable memory that stores a program code of moving image processing for detecting a cut point frame in an input moving image, comprising:
   a program code for a calculation step of calculating similarities between neighboring frames in the moving image formed by a plurality of frames;
   a program code for a cut point determination step of determining cut point frames in the moving image on the basis of the similarities calculated in the calculation step;
   a program code for a scene duration determination step of determining if a scene duration between neighboring cut point frames determined in the cut point determination step is smaller than a predetermined value;
   a program code for a determination step of determining the presence/absence of a flash portion in the moving image on the basis of a determination result in the scene duration determination step; and
   a program code for a correction step of correcting determination results in the cut point determination step on the basis of the determination result in the determination step,
   wherein the determination step determines the presence/absence of a flash portion in the moving image on the basis of brightness values between neighboring cut point frames which are determined in said scene duration determination step, and have a duration smaller than a predetermined value,
   wherein the determination step determines that a flash portion is present between neighboring cut point frames when the number of frames having brightness values not less than a threshold value in a scene between the neighboring cut point frames occupies a predetermined ratio of the scene duration.

* * * * *

UNITED STATES PATENT AND TRADEMARK OFFICE
CERTIFICATE OF CORRECTION

PATENT NO. : 7,038,736 B2
APPLICATION NO. : 09/954302
DATED : May 2, 2006
INVENTOR(S) : Hiroshi Tojo Page 1 of 1

It is certified that error appears in the above-identified patent and that said Letters Patent is hereby corrected as shown below:

IN THE DRAWING, SHEET NO. 11 of 22:
Figure 11B, Item S11100, "SERCH" should read --SEARCH--.

COLUMN 5:
Line 3, "of table." should read --of a table.--.

COLUMN 8:
Line 31, "these frame" should read --these frames--.

COLUMN 9:
Line 55, "influence" should read --influence,--.

COLUMN 11:
Line 43, "of table." should read --of a table.--.

COLUMN 13:
Line 20, "influence" should read --influence,--.

COLUMN 14:
Line 26, "frame" should read --frame,--.
Line 46, "such" should read --such a--.

Signed and Sealed this

Thirtieth Day of January, 2007

JON W. DUDAS
*Director of the United States Patent and Trademark Office*